US010226897B2

(12) United States Patent
Biegler et al.

(10) Patent No.: US 10,226,897 B2
(45) Date of Patent: *Mar. 12, 2019

(54) APPARATUS AND METHODS FOR IMPINGING A FLUID ON A SUBSTRATE

(71) Applicant: 3M INNOVATIVE PROPERTIES COMPANY, St. Paul, MN (US)

(72) Inventors: Kristopher K. Biegler, Minneapolis, MN (US); Michael R. Gorman, Lake Elmo, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/623,226

(22) Filed: Feb. 16, 2015

(65) Prior Publication Data

US 2015/0158279 A1 Jun. 11, 2015

Related U.S. Application Data

(62) Division of application No. 13/160,036, filed on Jun. 14, 2011, now Pat. No. 8,956,496.

(51) Int. Cl.
*B29C 65/10* (2006.01)
*B32B 37/04* (2006.01)
(Continued)

(52) U.S. Cl.
CPC ............ *B29C 65/10* (2013.01); *B29C 65/103* (2013.01); *B29C 66/0242* (2013.01); *B29C 66/1122* (2013.01); *B29C 66/45* (2013.01); *B29C 66/7294* (2013.01); *B29C 66/7392* (2013.01); *B29C 66/83415* (2013.01); *B32B 37/0038* (2013.01); *B32B 37/0046* (2013.01);
(Continued)

(58) Field of Classification Search
CPC ..... B29C 65/10; B29C 65/103; B29C 65/106; B29C 66/002; B29C 2035/045; B29C 2035/046; B29C 2035/047; B29C 2035/048; B32B 37/04; B32B 37/06
USPC ........ 156/82, 285, 308.2, 309.6, 309.9, 322, 156/324, 381, 382, 497, 499
See application file for complete search history.

(56) References Cited

U.S. PATENT DOCUMENTS 3,210,227 A 10/1965 Shichman
3,297,513 A * 1/1967 Robinson ............... B29D 29/00
198/847

(Continued)

FOREIGN PATENT DOCUMENTS

DE 296 17 525 12/1996
JP 11-170791 6/1999
KR 10-2000-0057141 9/2000

OTHER PUBLICATIONS

International Search Report, PCT/US2012/040682, dated Dec. 10, 2012, 4 pages.
(Continued)

*Primary Examiner* — John L Goff, II
(74) *Attorney, Agent, or Firm* — Steven A. Bern; Ted K. Ringsred

(57) ABSTRACT

Apparatus and methods for impinging a heated fluid onto the surface of a substrate and then locally removing the impinged fluid. The apparatus and methods may be used to heat a surface of a substrate e.g. so that the substrate can be melt-bonded to another substrate.

9 Claims, 8 Drawing Sheets

(51) Int. Cl.
  *B32B 37/06*   (2006.01)
  *B29C 65/00*   (2006.01)
  *B32B 37/00*   (2006.01)
  *B32B 37/20*   (2006.01)
  *B29C 65/18*   (2006.01)
  *B29C 65/26*   (2006.01)

(52) U.S. Cl.
  CPC .............. *B32B 37/04* (2013.01); *B32B 37/06* (2013.01); *B32B 37/20* (2013.01); *B29C 65/18* (2013.01); *B29C 65/26* (2013.01); *B29C 66/71* (2013.01); *B29C 66/723* (2013.01); *B29C 66/72321* (2013.01); *B29C 66/73921* (2013.01); *B29C 66/83413* (2013.01); *B29C 66/919* (2013.01); *B32B 37/203* (2013.01); *B32B 2309/02* (2013.01); *B32B 2310/0409* (2013.01); *Y10T 156/1744* (2015.01)

(56) References Cited

U.S. PATENT DOCUMENTS

| | | | |
|---|---|---|---|
| 3,843,480 A | 10/1974 | Dreher | |
| 4,021,287 A | 5/1977 | Martin | |
| 4,225,376 A | 9/1980 | Berg | |
| 4,450,038 A * | 5/1984 | Ishii | B29C 66/1312 |
| | | | 156/304.1 |
| 5,147,690 A | 9/1992 | Faust | |
| 5,384,341 A | 1/1995 | Itagaki et al. | |
| 5,916,413 A | 6/1999 | Johnson et al. | |
| 5,976,249 A | 11/1999 | Stahl | |
| 6,019,152 A * | 2/2000 | Haynes | D04H 1/54 |
| | | | 156/433 |
| 6,066,221 A | 5/2000 | Marmon | |
| 6,238,767 B1 | 5/2001 | McCormack | |
| 6,256,903 B1 | 7/2001 | Rudd | |
| 6,375,776 B1 | 4/2002 | Buoni | |
| 7,416,627 B2 | 8/2008 | Day | |
| 8,956,496 B2 * | 2/2015 | Biegler | B32B 37/04 |
| | | | 156/309.9 |
| 9,096,960 B2 * | 8/2015 | Biegler | B29C 65/103 |
| 9,126,224 B2 * | 9/2015 | Biegler | B05C 5/001 |
| 2003/0056925 A1 | 3/2003 | Beck | |
| 2004/0068848 A1 | 4/2004 | Ausen | |
| 2006/0065357 A1 | 3/2006 | Sikorski | |
| 2006/0248745 A1 | 11/2006 | Viswanath | |
| 2011/0147475 A1 | 6/2011 | Biegler et al. | |
| 2011/0151171 A1 | 6/2011 | Biegler et al. | |

OTHER PUBLICATIONS

"STP—Standard Temperature and Pressure & NTP—Normal Temperature and Pressure" engineeringtoolbox.com as captured by archive.org on Apr. 21, 2006.
U.S. Appl. No. 12/974,536, filed Dec. 21, 2010.
U.S. Appl. No. 12/974,329, filed Dec. 21, 2010.
U.S. Appl. No. 13/029,155, filed Feb. 17, 2011.

* cited by examiner

APPARATUS AND METHODS FOR IMPINGING A FLUID ON A SUBSTRATE

CROSS REFERENCE TO RELATED APPLICATIONS

This application is a divisional of U.S. application Ser. No. 13/160,036, filed on Jun. 14, 2011, U.S. Pat. No. 8,956,496, the disclosure of which is incorporated by reference in its entirety herein.

BACKGROUND

Fluids, e.g. heated fluids, are often impinged upon substrates for a variety of purposes. For example, a heated fluid may be impinged upon a substrate for purposes of annealing, drying of a surface coating, promoting a chemical reaction or a physical change, and the like. Often, an impinged fluid is allowed to escape into the surrounding atmosphere, where it may be allowed to disperse or may be at least partially removed by a duct, hood, or the like.

SUMMARY

Herein are disclosed apparatus and methods for impinging a heated fluid onto the surface of a substrate and then locally removing the impinged fluid. The apparatus and methods may be used to heat a surface of a substrate e.g. so that the substrate can be melt-bonded to another substrate.

Thus in one aspect, herein is disclosed a method of impinging a heated first fluid onto a first surface of a first moving substrate, and locally removing at least a portion of the impinged heated first fluid, and bonding the first surface of the first moving substrate to a first surface of a second moving substrate, the method comprising: providing at least one first fluid delivery outlet and at least one first fluid capture inlet that is locally positioned relative to the first fluid delivery outlet; passing the first moving substrate by the first fluid delivery outlet and impinging a heated first fluid from the first fluid delivery outlet onto the first surface of the first moving substrate so that the first surface of the first substrate is a heated surface; locally capturing at least 60% of the volumetric flow of impinged first fluid by way of the at least one first fluid capture inlet and removing the locally captured first fluid through at least one first fluid removal channel that is fluidly connected to the first fluid capture inlet; contacting a first surface of a second moving substrate with a second fluid that is at least 100 degrees C. lower in temperature than the temperature of the heated first fluid; and, contacting the heated first surface of the first substrate with the first surface of the second substrate so that the first surface of the first substrate and the first surface of the second substrate melt-bond to each other.

Thus in another aspect, herein is disclosed an apparatus for impinging a heated first fluid onto a first surface of a first moving substrate, and locally removing at least a portion of the impinged heated first fluid, and bonding the first surface of the first moving substrate to a first surface of a second moving substrate, the apparatus comprising: at least one first fluid delivery outlet and at least one first fluid capture inlet that is locally positioned relative to the first fluid delivery outlet; a first backing surface configured to support the first moving substrate and to carry the first moving substrate by the first fluid delivery outlet so that a heated first fluid that is delivered from the first fluid delivery outlet is impinged upon the first surface of the first moving substrate so that it is a heated first surface; and, a second backing surface configured to support the second moving substrate and to carry the second moving substrate along a converging path which brings the first major surface of the second moving substrate into contact with the heated first surface of the first moving substrate.

Figure 1:
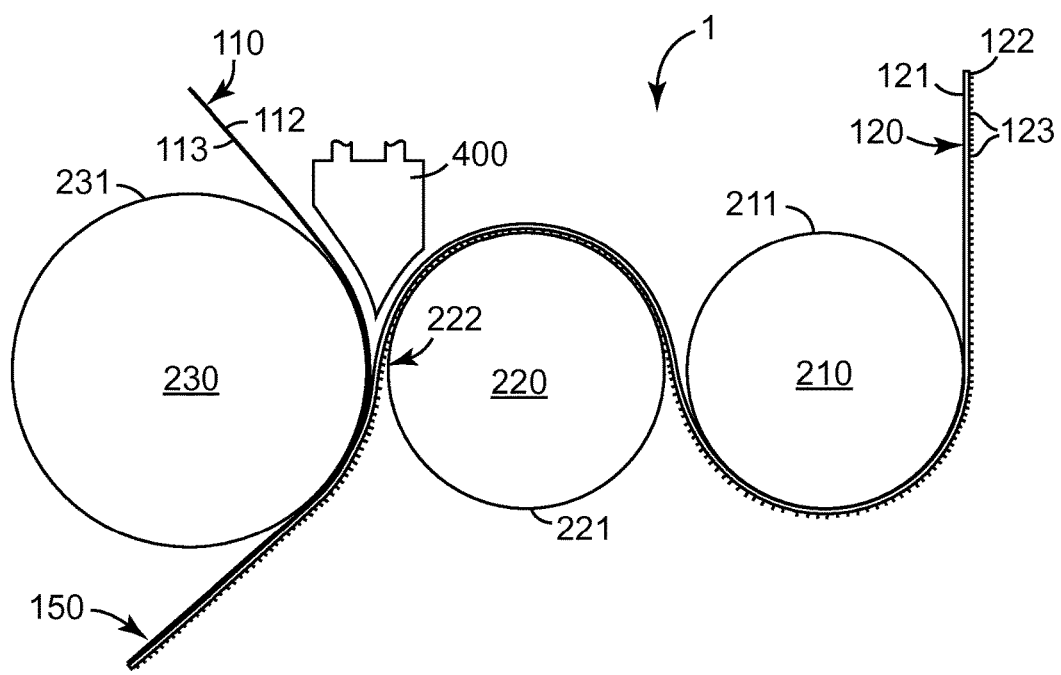
FIG. 1 is a side view of an exemplary apparatus and process that may be used to impinge a heated fluid onto a first substrate and to bond the first substrate to a second substrate.

Like reference numbers in the various figures indicate like elements. Some elements may be present in similar or identical multiples; in such cases the elements may comprise the same reference number, with one or more of the elements designated by a prime (') for convenience of description. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated. Although terms such as "top", bottom", "upper", lower", "under", "over", "front", "back", "outward", "inward", "up" and "down", and "first" and "second" may be used in this disclosure, it should be understood that those terms are used in their relative sense only unless otherwise noted.

DETAILED DESCRIPTION

The apparatus and methods described herein are directed to the impinging of a heated first fluid (i.e., a heated gaseous fluid) onto a first (major) surface of a first moving substrate so that the first surface becomes a heated first surface, and the local removal of at least a portion (e.g., at least about 60 volume percent, at least about 80 volume percent, or substantially all) of the impinged heated first fluid. The apparatus and methods described herein are further directed to the contacting of a first surface of a second moving substrate with a second fluid that is at least 100 degrees C. lower in temperature than the temperature of the heated first fluid (such second fluid that is at least 100 degrees C. lower in temperature than the temperature of the heated first fluid will be referred to herein for convenience as "lower-temperature" second fluid). By at least 100 degrees C. lower in temperature is meant that the temperature of the second fluid is lower than that of the heated first fluid by a difference of at least 100 degrees C. For example, if the temperature of the heated first fluid is 150° C., the temperature of the second fluid is 50° C. or lower.

In some embodiments, the second fluid may be a heated fluid (although remaining at least 100 degrees C. lower in temperature than that of the first heated fluid, as defined above) that is impinged on the first surface of the second substrate e.g. by way of a conventional blower, duct, hot air delivery system, or the like. In some embodiments, the second fluid may be an ambient-temperature fluid (meaning it is generally at the temperature of the ambient surrounding air in which the apparatus is located). In such case, the ambient-temperature fluid may be a moving fluid (e.g., forced air) that is actively impinged onto the first surface of the second substrate, e.g. by a conventional blower, etc. Alternatively, the ambient-temperature fluid may be quiescent (unforced) air, with the contacting of the air with the first surface of the second substrate occurring by virtue of motion of the second substrate through the quiescent air. In some embodiments, the second fluid may be a cooled fluid, meaning fluid which has been cooled (e.g., through the use of refrigeration equipment, cooling water, or the like) to a temperature that is colder than the ambient temperature of the surrounding air, and that is contacted with (e.g., impinged upon) the first surface of the second substrate.

In some embodiments in which the second fluid is impinged upon the first surface of the second substrate, no mechanism for actively removing the impinged second fluid may be employed. In other embodiments, a conventional hood, shroud, duct, etc., may be used to (non-locally) actively remove at least a portion of the impinged second fluid. In some embodiments, the second fluid (whether heated, cooled, or ambient-temperature) may be impinged onto the first surface of the second substrate by way of a fluid delivery outlet, with at least a portion (e.g., at least about 60 volume percent, at least about 80 volume percent, or substantially all) of the impinged second fluid being locally removed by at least one second fluid capture inlet, as discussed in detail elsewhere herein.

In various embodiments, the temperature of the heated first fluid may be at least about 150° C., at least about 200° C., at least about 250° C., or at least about 300° C. In various embodiments, the temperature of the lower-temperature second fluid may be at most about 200° C., at most about 100° C., or at most about 50° C. In some embodiments, the lower-temperature second fluid may be at ambient temperatures (which, depending on the particular environment in which the apparatus is located, may range from e.g. 15° C. to 35° C.). In some embodiments, the lower-temperature second fluid may be cooled to below the ambient temperature, as mentioned above.

The heated first surface of the first moving substrate (upon which the heated first fluid was impinged), and the first surface of the second moving substrate (with which the second fluid was contacted), may then be contacted with each other to facilitate melt-bonding (e.g. surface-bonding) of the surfaces to each other. That is, after the heating of the first surface of the first substrate by the impinged heated first fluid, the first surfaces of the first and second substrate can be brought into contact with each other while the first surface of the first substrate remains in a heated condition which will, upon contact with the first surface of the second substrate, cause the temperature of the first surface of the second substrate to momentarily increase so that melt-bonding can be achieved. Those of ordinary skill in the art will recognize such melt-bonding as a process in which molecules of the first substrate and of the second substrate at least slightly intermix while in a heated state and then remain intermixed upon cooling and solidification so that a bond is achieved.

As disclosed herein, the impinging of the heated first fluid onto the first surface of a moving substrate can raise the temperature of the first surface of the first substrate sufficiently for melt-bonding to be achieved, without necessarily raising the temperature of the remaining portions of the first substrate (e.g., the interior of the substrate and/or the second, opposing major surface of the substrate) to a point sufficient to cause unacceptable physical changes or damage to the first substrate. Moreover, the contacting of the second substrate with a lower-temperature second fluid may ensure that the second substrate is not unacceptably physically changed or damaged by the process of being melt-bonded to the first substrate.

Figure 2:
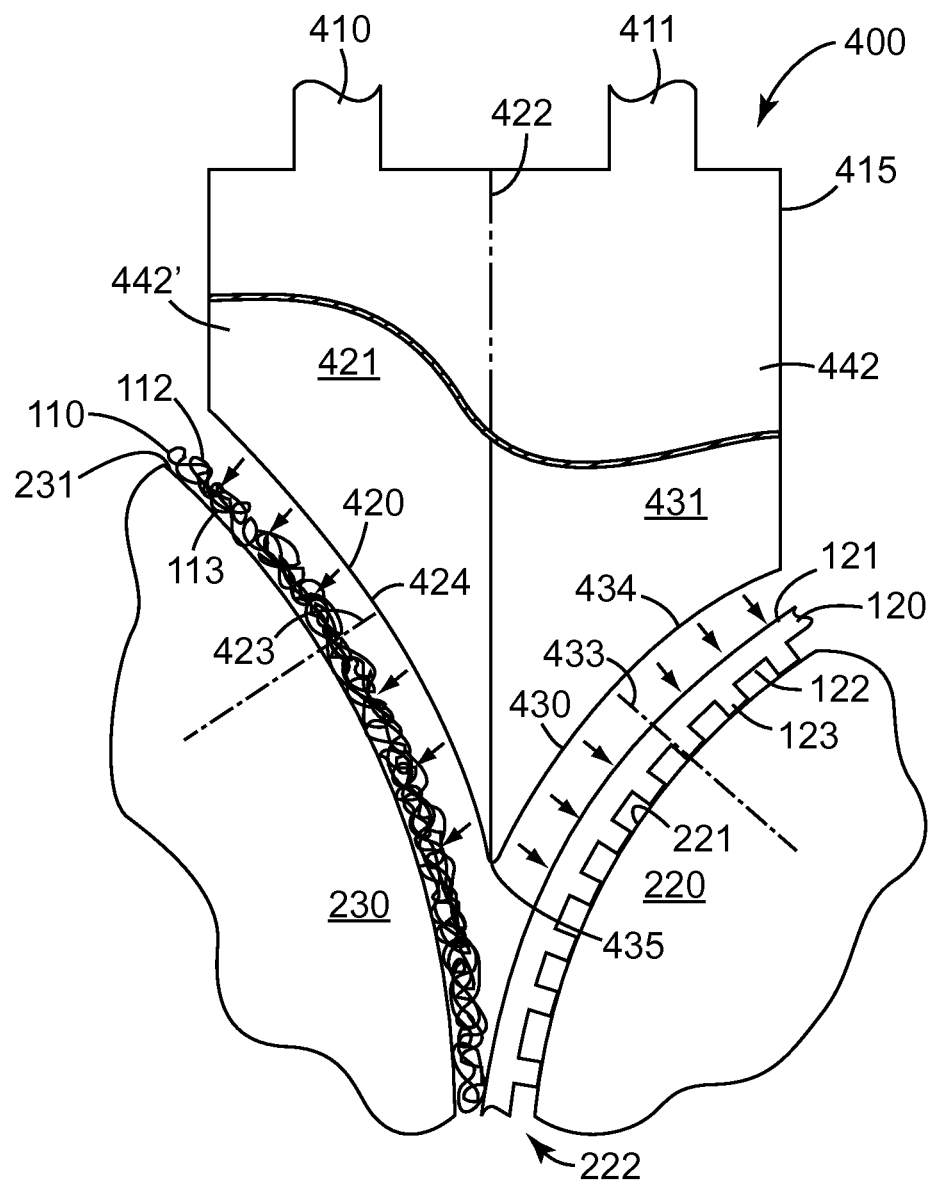
FIG. 2 is an expanded side view in partial cutaway of a portion of the exemplary apparatus and process of FIG. 1.

Shown in FIG. 1 is an exemplary apparatus 1 that can be used at least to perform the methods described herein. By the use of apparatus of the general type shown in FIG. 1, a first moving substrate 110 (which is shown in FIG. 2 in exemplary manner as being a fibrous web, but, as related later, may be any suitable substrate with a melt-bondable first surface 112) and a second moving substrate 120 (which is shown in FIG. 1 as being a film substrate containing protrusions, but may be any suitable substrate with a melt-bondable first surface 121) can be melt-bonded to each other. In use of apparatus 1, first moving substrate 110 passes by nozzle 400 such that heated first fluid can thereby be impinged on first surface 112 of first substrate 110. During this process, first substrate 110 may be in contact with a backing surface 231. Backing surface 231 may serve to support first substrate 110, and may, if desired, be held, at a desired temperature (e.g. 100, 200, or 300 or more degrees C. below the temperature of the impinging heated first fluid), so as to assist in keeping the rest of the first substrate sufficiently cool to prevent or minimize damage, melting, etc., of the substrate, during the time that the first surface of the substrate is heated so as to facilitate the melt-bonding. Meanwhile, first surface 121 of second moving substrate 120 is contacted with a lower-temperature second fluid (which may issue from nozzle 400, or from some other source, or may comprise ambient air through which second substrate 120 moves). During this process, second substrate 120 may be in contact with a backing surface 221. Backing surface 221 may be held at any desired temperature so as to control the temperature of second substrate 120 (e.g., in cooperation with the contacting of substrate 120 with a lower-temperature second fluid).

Backing surfaces 231 and 221 may comprise any suitable surface. If a moving substrate is discontinuous or porous (e.g., if the substrate is a fibrous web) such a backing surface may be a solid surface that serves to occlude the second major surface of the substrate such that the impinging fluid does not penetrate through the thickness of the substrate and exit through the second major surface of the substrate. Thus in these embodiments, the heating of a major surface of a moving substrate by the impinging of heated fluid as described herein, does not encompass methods in which a heated fluid is impinged upon a major surface of a substrate and passed through the substrate so as to exit through the oppositely-facing major surface of the substrate.

In some embodiments, a backing surface may be provided by a backing roll, e.g., a temperature-controlled roll. Thus, in the exemplary illustration of FIG. 1, second major surface 113 of substrate 110 is in contact with surface 231 of backing roll 230 during the impinging of heated fluid onto first major surface 112 of substrate 110. Likewise, second major surface 122 of substrate 120 (or the outermost surface of protrusions 123, if such protrusions are present), is in contact with surface 221 of backing roll 220 during the contacting of first major surface 121 of substrate 120 with a lower-temperature second fluid. In some embodiments, a temperature-controlled roll can be used to preheat or precool a surface of one or both of substrates 110 and 120. In the exemplary illustration of FIG. 1, major surface 121 of substrate 120 may be brought into contact with surface 211 of roll 210 to preheat or precool at least surface 121 of substrate 120.

In the illustrated embodiment of FIG. 1, backing roll 220 and backing roll 230 respectively carry first moving substrate 110 and second moving substrate 120 along converging pathways in which, in nip 222, first major surface 112 of substrate 110 and first major surface 121 of substrate 120 are brought into contact with each other while first major surface 112 of first substrate 110 is at a temperature (established by the heated first fluid impingement) sufficient to cause at least surface-bonding of surfaces 112 and 121 (of substrates 110 and 120, respectively), to each other to form laminate 150. As mentioned herein, it may be advantageous to perform such bonding under conditions which minimize any damage, crushing and the like, to any component of substrates 110 and 120. This may be particularly useful in the event that, as shown in FIG. 1, substrate 120 comprises protrusions (e.g., that might be susceptible to being deformed or crushed). Thus, backing rolls 230 and 220 may be arranged so as to operate nip 222 at very low pressure in comparison to the pressures normally used in the lamination of materials (for which relatively high pressure is often preferred). In various embodiments, the bonding of substrates 110 and 120 together may be performed with a lamination nip pressure of less than about 15 pounds per linear inch (27 Newtons per linear cm), less than about 10 pli (18 Nlc), or less than about 5 pli (9 Nlc). In further embodiments, backing roll 230, backing roll 220, or both, may comprise at least a surface layer of a relatively soft material (e.g., a rubber material with a hardness of less than 70 on the Shore A scale). Such a relatively soft surface layer may be achieved e.g. by the use of a roll with a permanently attached soft surface coating, by the use of a removable sleeve of soft material, by covering the surface of the backing roll with relatively soft and resilient tape, and the like. If desired, the surface of one or both backing rolls may be stepped across the face of the roll so as to provide lamination pressure selectively in certain locations.

Upon exiting nip 222, laminate 150 may be cooled if desired, e.g. by contacting one or both major surfaces of laminate 150 with a cooling roll, by the impinging of a cooling fluid upon one or both surfaces of laminate 150, and the like. Laminate 150 may thereafter be processed through any suitable web-handling process, rolled up, stored, etc. For example, additional layers may be coated or laminated on laminate 150, individual pieces may be cut therefrom as described previously, and so on.

In some embodiments, the impinging of a heated first fluid onto first surface 112 of substrate 110, and the impinging of a lower-temperature second fluid onto the first surface 121 of substrate 120, may be achieved by the use of nozzle 400 as illustrated in exemplary manner in FIG. 2. (It should be noted that in order for clarity of depiction of the fluid-delivering structures of nozzle 400 to be enhanced, structures which facilitate local removal of impinged fluid, which are described later herein, are not illustrated in FIG. 2).

As shown in side view in FIG. 2 (viewed along an axis transverse to the direction of motion of substrates 110 and 120, i.e., an axis aligned with the long axes of backing rolls 220 and 230), nozzle 400 comprises at least a first fluid delivery outlet 420, through which a heated first fluid may be impinged onto first major surface 112 of substrate 110, and a second fluid delivery outlet 430 through which a lower-temperature second fluid may be impinged onto first major surface 121 of substrate 120. It should be noted that references herein to first fluid delivery outlet, second fluid delivery outlet, etc. are used for convenience of differentiating separate outlets (that are used to respectively deliver fluids onto first and second substrates), etc., from each other, and should not be interpreted as requiring that the fluids delivered by the different outlets etc. must differ in composition (although they will differ in temperature, as disclosed herein). First fluid delivery outlet 420 is supplied with heated fluid by first fluid delivery channel 421 to which it is fluidly connected, and second fluid delivery outlet 430 is supplied with lower-temperature fluid by second fluid delivery channel 431 to which it is fluidly connected.

Portions of the interior of nozzle 400 may be divided (e.g., by interior partition 422 shown in FIG. 2) into first fluid delivery channel 421 and second fluid delivery channel 431 that are physically separate and that are not fluidly connected with each other. In such manner, second fluid delivery channel 431 and second fluid delivery outlet 430 may thus be supplied, by second fluid supply line 411, with a lower-temperature second fluid that is at least 100 degrees C. lower in temperature than the temperature of the heated first fluid (and may also differ in pressure, velocity, flowrate, composition, etc.) that is supplied to first fluid delivery channel 421 and first fluid delivery outlet 420.

While the exemplary nozzle 400 of FIG. 2 is shown as a single unit from which a heated first fluid may be impinged onto first major surface 112 of first substrate 110 and from which a lower-temperature second fluid may be impinged onto first major surface 121 of second substrate 120, it will be appreciated that the herein-discussed methods may be performed e.g. by the use of two adjacent but physically separated units one of which impinges heated first fluid through its fluid delivery outlet onto first major surface 112 of substrate 110 and the other of which impinges lower-temperature second fluid through its fluid delivery outlet onto first major surface 121 of substrate 120. Thus, while the term "nozzle" is used herein for convenience of discussion, the apparatus (e.g., nozzle) described herein should be understood to encompass apparatus in which a single unit impinges a heated first fluid, and a lower-temperature second fluid, onto first and second substrates respectively, as well as a multiple-unit apparatus in which one unit impinges a heated first fluid onto a first substrate and another unit (which may be a physically separate unit) impinges a lower-temperature second fluid onto a second substrate.

Typically, nozzle 400 will comprise solid (i.e., impermeable) partitions 442 and 442' that collectively define fluid delivery channels 421 and 431. The terminal ends of partitions 442 and 442' that are closest to substrate 110 may collectively define fluid delivery outlet 420 (and may be the only elements that define fluid delivery outlet 420 if outlet 420 does not comprise a fluid-permeable sheet (described later in detail) at its working face. Similarly, the terminal ends of partitions 442 and 442' that are closest to substrate 120 may collectively define fluid delivery outlet 430.

Figure 3A:
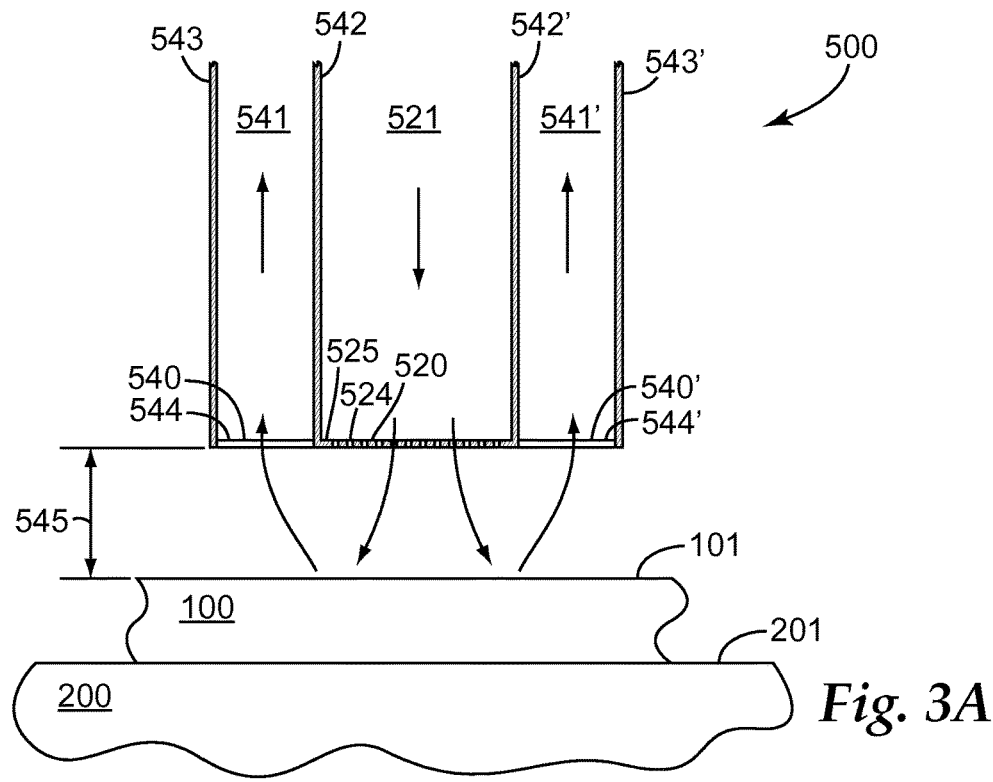
FIG. 3a is a cross sectional diagrammatic illustration of a portion of an exemplary apparatus and process that may be used to impinge a fluid onto a substrate and to locally remove the impinged fluid.

Partitions 442 and 442' may be positioned generally parallel to each other (e.g., in similar manner as shown in FIG. 3a for partitions 542 and 542', which define fluid delivery channel 521 of nozzle 500 in similar manner that partitions 442 and 442' define fluid delivery channel 421 of nozzle 400), if it is desired that fluid delivery channels 421 and/or 431 have constant width. Or, the width between partitions 442 and 442' may vary if it is desired e.g. provide a fluid delivery channel that narrows or expands as the fluid progresses down the channel. In addition to partitions 442 and 442', nozzle 400 may comprise one or more partitions 415 that define the rear portion of nozzle 400 (away from the fluid delivery outlets). Thus, nozzle 400 may comprise at least partitions 442, 442', and 415, which collectively provide an enclosure which is subdivided by partition 422 into first fluid delivery channel 421 into which heated first fluid may be supplied by supply line 410 and second fluid delivery channel 431 into which lower-temperature second fluid may be supplied by supply line 411, with the primary, or only, pathways for a fluid to exit nozzle 400 being through fluid delivery outlets 420 and 430.

For convenience of description, first fluid delivery outlet 420 is characterized as comprising working face 424, which can be most conveniently considered to be the surface through which the heated fluid passes as it exits outlet 420. Working face 424 may be an imaginary surface, such as an imaginary arcuate surface (e.g., a section of a cylindrical surface) defined by terminal ends of partitions 442 and 442'. Or, working face 424 may comprise a physical layer, e.g. a fluid-permeable sheet, as discussed later herein in detail. Second fluid delivery outlet 430 is likewise characterized as comprising working face 434.

Each outlet and working face thereof may have a circumferential length, and a lateral width (extending in a direction transverse to the direction of motion of the adjacent substrate, i.e. extending in a direction aligned with the long axes of the adjacent backing roll). In some embodiments, the circumferential length may be longer than the lateral width, so that the outlet is circumferentially elongated. While in the exemplary illustration of FIG. 2, first fluid delivery outlet 420 extends over the entire circumferential length of the face of nozzle 400 that is adjacent to roll 230 (with second fluid delivery outlet 430 likewise extending over the entire circumferential length of the face of nozzle 400 that is adjacent to roll 220), in some embodiments each face of nozzle 400 can comprise multiple separate fluid delivery outlets. Such multiple outlets may be defined by laterally-oriented dividers (e.g., vanes) and may be spaced over the circumferential length of a nozzle face.

In the exemplary embodiment of FIG. 2, first fluid delivery outlet 420 and second fluid delivery outlet 430 are in diverging relation. The term diverging relation can be defined by way of axis 423 drawn normal to working face 424 of first fluid delivery outlet 420, and axis 433 drawn normal to working face 434 of second fluid delivery outlet 430, as depicted in FIG. 2. By diverging relation is meant that normal axis 423 of first fluid delivery outlet 420, and normal axis 433 of second fluid delivery outlet 430, when extended from their respective working faces in a direction away from nozzle 400, do not intersect regardless of how far they are extended. By diverging relation is additionally meant that normal axis 423 and normal axis 433 are oriented at least 25 degrees away from each other (by way of example, in FIG. 2, normal axis 423 and normal axis 433 are oriented approximately 90 degrees away from each other). In various embodiments, normal axes 423 and 433 are oriented at least about 40, at least about 60, or at least about 80 degrees away from each other. In further embodiments, normal axes 423 and 433 are oriented at most about 140, at most about 120, or at most about 100 degrees away from each other.

Those of ordinary skill in the art will realize that in embodiments with arcuate fluid delivery outlets (described below in more detail), the relative orientation of normal axes 423 and 433 may vary with the circumferential location along each outlet at which the normal axis is positioned. In such cases, the denoting that two fluid delivery outlets are in diverging relation means that at least the portions of the two outlets that are in closest proximity to each other (e.g., the portions of outlets 420 and 430 that are proximal to salient 435) are in diverging relation. In some cases, e.g. in which at least one of the fluid delivery outlets is circumferentially extended so as to form e.g. a nearly-semicylindrical shape, a portion of that fluid delivery outlet that is distal to the other fluid delivery outlet (e.g., distal to salient 435) may not be in diverging relation with any or all portions of the other fluid delivery outlet. However, in such cases, as long as the above-described condition is met in which at least portions of the two outlets that are in closest proximity to each other are in diverging relation, the fluid delivery outlets are still considered to be in diverging relation as defined herein.

First and second fluid delivery outlets 420 and 430 arranged in diverging relation as disclosed herein may be particularly advantageous for the directing of first and second fluids onto two converging substrates. In particular, such fluid delivery outlets in diverging relation allow nozzle 400 to be placed closely adjacent to a nip (e.g., a lamination nip) established by backing rolls, e.g., in the manner depicted in FIGS. 1 and 2.

In the exemplary illustration of FIGS. 1 and 2, first fluid delivery outlet 420 is arcuate with working face 424 that is generally congruent with (that is, has a generally similar shape to and generally parallels) the adjacent surface of backing roll 230. This may be advantageous in allowing working face 424 of first fluid delivery outlet 420 to be placed in close proximity to backing roll 230. Thus, in various embodiments, in operation of nozzle 400, working face 424 of first fluid delivery outlet 420 may be less than about 10, 5 or 2 mm from first major surface 112 of substrate 110, at the point of closest approach. Likewise, in the exemplary illustration of FIGS. 1 and 2, second fluid delivery outlet 430 is arcuate with a working face 434 that is generally congruent with the adjacent surface of backing roll 220. This may be advantageous in allowing working face 434 of second fluid delivery outlet 430 to be placed in close proximity to backing roll 220. In various embodiments, in operation of nozzle 400, working face 434 of second fluid delivery outlet 430 may be less than about 10, 5 or 2 mm from first major surface 121 of substrate 120, at the point of closest approach.

In particular embodiments, first fluid delivery outlet 420 is arcuate with a working face 424 that is generally congruent with the adjacent surface of backing roll 230, and second fluid delivery outlet 430 is arcuate with a working face 434 that is generally congruent with the adjacent surface of backing roll 220. This may allow nozzle 400 to be positioned such that each working face of each fluid delivery outlet is very close to the first major surface of its respective substrates.

In embodiments in which outlets 420 and 430 are desired to be closely mated to the adjacent surface of (cylindrical) backing rolls, the working face of each outlet may comprise an arcuate shape that is a section of a generally cylindrical surface with a radius of curvature matching that of the surface of the backing roll to which the outlet is to be mated. In situations in which backing roll 220 and backing roll 230 are the same diameter, the two fluid delivery outlets thus may be symmetric with the same radius of curvature. However, if backing roll 220 and backing roll 230 differ in diameter, as in the embodiment shown in FIGS. 1 and 2, the curvature of first fluid delivery outlet 420 may differ from that of second fluid delivery outlet 430.

The circumferential length of each arcuate outlet may differ as desired. For example, in FIGS. 1 and 2, the circumferential length of outlet 420 is longer than that of outlet 430. Optionally, one or both outlets may comprise an adjustable shutter (not shown in any figure) that may be adjusted so as to change the circumferential length of the outlet. Such a shutter may be used to adjust the dwell time of a substrate in an impinging fluid, e.g. independently of the speed of movement of the substrate. In operation of apparatus 1, the position of the shutter, as well as other process variables such as fluid temperature, fluid flowrate, backing roll temperatures, etc., may be manipulated as desired, e.g. in view of the line speed, thickness and other properties of the particular substrates being processed. In particular, such a shutter positioned e.g. on second fluid delivery outlet 430 may be completely closed so that a second fluid is not impinged onto first major surface 121 of substrate 120, as discussed later herein.

Fluid delivery outlet 420 and fluid delivery outlet 430 may be chosen to have any suitable lateral width. As used herein, lateral means in the direction transverse to the direction of motion of a substrate to be heated and in a direction parallel to the long axis of the backing roll (i.e., the direction in and out of plane in FIGS. 1 and 2). In some embodiments, particularly those in which at least one of the substrates to be bonded is in the form of a narrow strip, it may be desired that the lateral width of a fluid delivery outlet be relatively narrow (e.g., chosen in consideration of the width of the substrate to be bonded). In such case it may further be desired that a fluid delivery outlet be elongated (e.g., circumferentially elongated) in a direction substantially aligned with the long axis of, and the direction of motion of, the substrate to be bonded (keeping in mind that the long axis and the direction of motion of the substrate may be arcuate when the moving substrate is supported by a backing roll). For example, in FIG. 2, working face 424 of outlet 420 is circumferentially elongated along an axis that is substantially aligned with the long axis and direction of motion of substrate 110.

A circumferential end of first fluid delivery outlet 420, and a circumferential end of second fluid delivery outlet 430, may be positioned adjacent to each other so as to form protruding salient 435, as shown in exemplary manner in FIG. 2. The angle of approach of the two outlets to each other may be such that the salient 435 takes the form of a relatively sharp protrusion, with working face 424 of outlet 420, and working face 434 of outlet 430, being at an acute angle relative to each other at their point of closest approach or contact. Such a sharply protruding design may advantageously permit salient 435 to be positioned deep into the converging nip region between backing rolls 220 and 230 and may allow fluid to be impinged upon each substrate substantially until the instant that the substrates contact each other. In various embodiments, at their point of closest approach working face 424 of outlet 420 and working face 434 of outlet 430 may be at an angle relative to each other of less than about 70, less than about 50, or less than about 30 degrees.

In some embodiments, the working surface of a fluid delivery outlet may not be congruent with the backing roll to which it is mated. For example, either or both of outlets 420 and 430 could be generally planar (flat) rather than arcuate as shown in FIGS. 1 and 2. While this may mean that the fluid delivery outlet may not be able to be positioned as close to the backing roll, and the distance from the working face to the backing roll may vary along the length of the fluid delivery outlet, this may still be acceptable in some cases.

As mentioned, the working face of a fluid delivery outlet may be open; or, it may comprise a fluid-permeable sheet through which the fluid may be passed. Such a fluid-permeable sheet may render the flow of fluid through the outlet more uniform, e.g. over the circumferential length of the outlet. Additionally, depending on the characteristics of the sheet, the sheet may redirect the fluid somewhat away from its original direction of flow through the fluid delivery channel. For example, with reference to FIG. 2, heated first fluid from supply 410 may flow through fluid delivery channel 421 in a direction generally aligned with the long axis of partition 422, but in passing through a fluid-permeable sheet at working face 424 of fluid delivery outlet 420 the fluid may be at least somewhat directed to flow in a direction more closely aligned with normal axis 423 of the working face 424 (e.g., as shown by the multiple arrows denoting fluid flow in FIG. 2). Such a design may have advantages in causing the heated first fluid to be impinged on substrate 110 in a direction closer to normal to the substrate, as opposed to impinging on substrate 110 in a more tangential orientation. Similar considerations apply with regard to the presence of a fluid-permeable sheet on working face 434 of outlet 430. Internal baffles (not shown in any figure) within fluid delivery channels 421 and/or 431 may also be used to direct the fluid in a desired direction.

In various embodiments, the fluid-permeable sheet may comprise through-openings that collectively provide the sheet with a percent open area of at least about 20, at least about 30, or at least about 40. In further embodiments, the fluid-permeable sheet may comprise a percent open area of at most about 90, at most about 80, or at most about 70. In specific embodiments, the fluid-permeable sheet may comprise a perforated screen with through-holes of a diameter of at least about 0.2 mm, at least about 0.4 mm, or at least about 0.6 mm. The fluid-permeable sheet may comprise e.g. a perforated screen with through-holes of a diameter of at most about 4 mm, at most about 2 mm, or at most about 1.4 mm. The through-holes may be in the form of elongated, e.g. laterally-elongated, slots or the like. The combination of percent open area and through-hole size may be chosen to enhance the uniform heating of the substrate. The screen may be comprised of any material with durability and temperature resistance sufficient for the uses outlined herein. Metal screen, e.g. steel, may be suitable.

A fluid (e.g., a heated first fluid) may exit a working face of a fluid delivery outlet at any suitable nominal linear velocity (volumetric flowrate divided by the open area of the outlet). The velocity of such a fluid may be affected and/or determined by the volumetric flowrate of fluid supplied to first fluid delivery channel 421 by supply line 410, by the size of fluid delivery outlet 420, by the percent open area and/or diameter of the through-holes in a fluid-permeable sheet (if present) at the working face of the outlet, etc. The linear velocity may often be in the low subsonic range, e.g., less than Mach 0.5, typically less than Mach 0.2. Often, the linear velocity will be in the range of a few meters per second; e.g., less than 50, less than 25, or less than 15 meters per second. As such, the fluid impingement apparatus and methods used herein can be distinguished from the use of e.g. hot air knives, which often rely on a linear velocity approaching or exceeding sonic velocity.

As mentioned, during operation of apparatus 1 the linear velocity of the lower-temperature second fluid exiting nozzle 400 through outlet 430 can be controlled independently of that the heated first fluid exiting through outlet 420. The area of working faces 424 and 434 of outlets 420 and 430, respectively, may be chosen so as to impinge fluid on an area of desired size, and may be chosen in consideration of the characteristics of the substrates to be heated (e.g., their width, thickness, density, heat capacity, etc.). Often, outlets with working faces in the range of from e.g. about 5 to 500 square centimeters may be used. The volumetric flowrate of the heated first fluid and of the lower-temperature second fluid, and the temperature thereof, may each be chosen as desired. For melt-bonding applications, the temperature of the heated first fluid may be chosen to be at least equal to, or somewhat above, the softening point or melting point of a component of the first substrate.

Any suitable heated gaseous fluid may be used as the heated first fluid, with ambient air being a convenient choice. However, dehumidified air, nitrogen, an inert gas, or a gas mixture chosen to have a specific effect (e.g. the promotion of bondability, hydrophobicity, etc.) may be used as desired. The fluid may be heated by an external heater (not shown in any figure) prior to being delivered to nozzle 400 through supply line 410. In addition, or instead, heating elements may be supplied within nozzle 400; or additional heating (e.g., resistance heating, infrared heating, etc.) of nozzle 400 may be applied. Similarly, the temperature of the lower-temperature second fluid may be controlled (via heating or cooling) by any suitable method.

As disclosed herein, the heated first fluid, after having been impinged on the first substrate, is locally removed. By local removal is meant that heated first fluid that has been impinged on the surface of the first substrate by a nozzle is actively removed from the local vicinity of the fluid impingement nozzle. This is to be contrasted with processes in which an impinged heated fluid is passively allowed to escape from the local vicinity of the nozzle, either to dissipate into the surrounding atmosphere or to be removed by a device (e.g., a hood, shroud, duct, etc.) that is positioned some distance (e.g., at least a decimeter) away from the fluid impingement nozzle. Such local removal can be achieved by the use of a nozzle of the general type described earlier herein, comprising a fluid delivery channel with a fluid delivery outlet, with the addition of at least one fluid capture inlet that is locally positioned relative to the fluid delivery outlet. By locally positioned it is meant that at their point of closest approach to each other, the fluid capture inlet is located less than 10 mm from the fluid delivery outlet. In various embodiments, at their point of closest approach, the fluid capture inlet is located less than about 5 mm, or less than about 2 mm, from the fluid delivery outlet. The fluid capture inlet is fluidly connected to a fluid removal channel, through which fluid that has been captured by the fluid capture inlet can be actively removed (e.g., by way of an exhaust line fluidly connected to an external suction blower, not shown in any figure). The fluid capture inlet can locally remove a substantial volume percent of the impinged fluid from the local vicinity of the nozzle before the impinged fluid is able to exit the local vicinity of the substrate and irreversibly disperse into the surrounding atmosphere so as to no longer be locally removable. In various embodiments, at least about 60%, at least about 80%, or substantially all, of the volumetric flow of the impinged heated first fluid is locally removed by the apparatus and methods disclosed herein.

Exemplary nozzle 500 with a locally positioned fluid capture inlet is shown in representative manner in FIG. 3a, which is a partial cross sectional view along the machine direction of a substrate 100 as it passes adjacent to nozzle 500 (with the direction of movement of substrate 100 being out of plane). For simplicity of description, FIG. 3a only shows a single fluid delivery channel 521, single fluid delivery outlet 520, and single (first) substrate 100 (in contact with backing surface 201, e.g. of backing roll 200). In some embodiments, such a nozzle may be "single-sided" (i.e., arranged to impinge only one fluid (i.e., a heated fluid) onto only one moving substrate), but it should be understood in embodiments in which it is desired to impinge a heated first fluid onto a first substrate of two converging substrates, and a lower-temperature second fluid onto a second substrate of the two converging substrates (in similar manner as described for nozzle 400), a nozzle may be used which comprises two fluid delivery channels, two fluid delivery outlets, etc., as will be discussed in further detail with respect to FIG. 4. Thus, representative substrate 100 of FIG. 3a could, in various embodiments and arrangements, represent a first substrate (e.g., substrate 110) onto which a heated fluid is impinged, or a second substrate (e.g., substrate 120) onto which a lower-temperature fluid is impinged.

While in the exemplary embodiment of FIG. 3a, fluid delivery outlet 520 and fluid delivery channel 521 thereof, and fluid capture inlets 540/540' and fluid removal channels 541/541' thereof, are shown as one unit, with common partitions 542 and 542' therebetween, it should be understood that the herein-discussed impinging and removal of fluid may be performed by the use of two or more adjacent but physically separated units, at least one of which impinges fluid through fluid delivery outlet 520 and at least another of which locally captures the impinged fluid through fluid capture inlet 540 or 540'. Thus, while the term "nozzle" is used herein for convenience of discussion, the apparatus (e.g., nozzle) described herein should be understood to encompass apparatus in which a single unit both impinges fluid and captures the impinged fluid, as well as multiple-unit apparatus in which one or more units impinge fluid and one or more additional units (which may be physically separate units) capture the impinged fluid.

In similar manner to nozzle 400, nozzle 500 comprises fluid delivery outlet 520 comprising working face 524 (which in this case comprises perforated screen 525), with fluid delivery outlet 520 being fluidly connected to fluid delivery channel 521 (of which only the portion proximate to fluid delivery outlet 520 is shown in FIG. 3a). Additionally, nozzle 500 comprises fluid capture inlets 540 and 540', each of which is locally positioned relative to fluid delivery outlet 520. Fluid capture inlets 540 and 540' are fluidly connected to fluid removal channels 541 and 541', respectively. In the exemplary configuration shown, fluid capture inlets 540 and 540' laterally flank (that is, they are located on either side of, in a direction transverse to the direction of motion of substrate 100, e.g. in a direction along the long axis of backing roll 200) fluid delivery outlet 520. Similarly, fluid removal channels 541 and 541' laterally flank fluid delivery channel 521, being separated therefrom only by (solid) partitions 542 and 542', respectively. Fluid removal channel 541 is thus defined on one lateral side by partition 542, and on the other lateral side by partition 543 (which in this embodiment comprises the external housing of nozzle 500 in this area). Fluid removal channel 541' is likewise defined by partitions 542' and 543'.

Referring again to the simplified, representative one delivery outlet, one-substrate illustration of FIG. 3a, when active suction is applied to fluid removal channels 541 and 541' (e.g., by an external suction fan or blower), a substantial volume percent of the fluid that exits working face 524 of fluid delivery outlet 520 and is impinged upon first major surface 101 of substrate 100, may be locally captured by fluid capture inlets 540 and 540' and removed by way of fluid removal channels 541 and 541'. It has been found that such local capture of impinged fluid may alter the flow patterns of the fluid after, during, or possibly even before it impinges on surface 101 of substrate 100. For example, such local capture may modify, reduce or substantially eliminate fluid flow stagnation phenomena in which the fluid impinges onto the substrate in such manner as to drastically slow or even stop the flow of the fluid in certain locations. In altering the flow patterns, the local capture may advantageously modify (e.g., increase) the heat transfer coefficient between the impinging fluid and the substrate in certain locations and/or it may provide a more uniform transfer of heat across a wider area of the substrate.

Working faces 544 and 544' of fluid capture inlets 540 may be positioned approximately even with working face 524 of fluid delivery outlet 520, so that working faces 544, 544' and 524 are generally equidistant from surface 101 of substrate 100, as represented by distance 545 in FIG. 3a (in the design of FIG. 3a, working faces 544 and 544' of fluid capture inlets 540 and 540' comprise imaginary surfaces rather than fluid-permeable screens). Nozzle 500 may be positioned such that working face 524 of fluid delivery outlet 520, and working faces 544 and 544' of fluid capture inlets 540, are positioned within about 10, about 5, or about 2 mm, of first major surface 101 of substrate 100. Terminal ends (closest to substrate 110) of partitions 542 and 543 may be generally equidistant from substrate 100, as shown in FIG. 3a. Or, the terminal end of outwardly-flanking partition 543 may be extended closer to substrate 110, which may enhance the capturing of impinged fluid by fluid capture inlet 540 (similar considerations apply for fluid capture inlet 540').

Figure 3B:
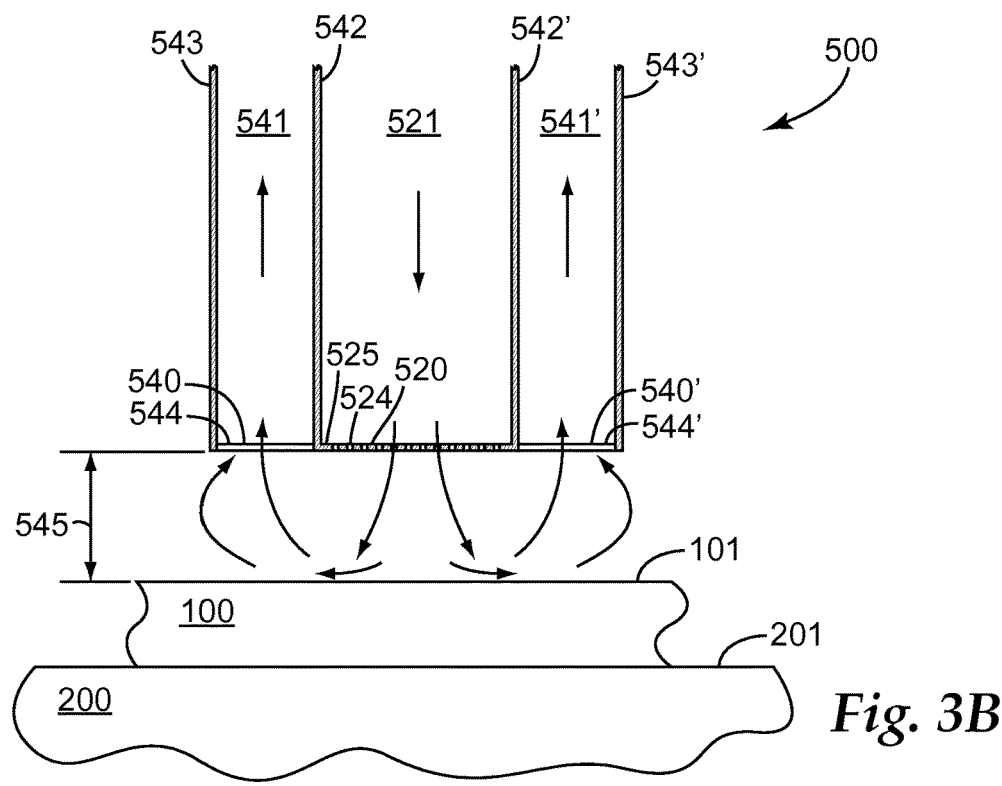
FIGS. 3b and 3c depict additional ways in which the exemplary apparatus and process of FIG. 3a may be operated.
Figure 3C:
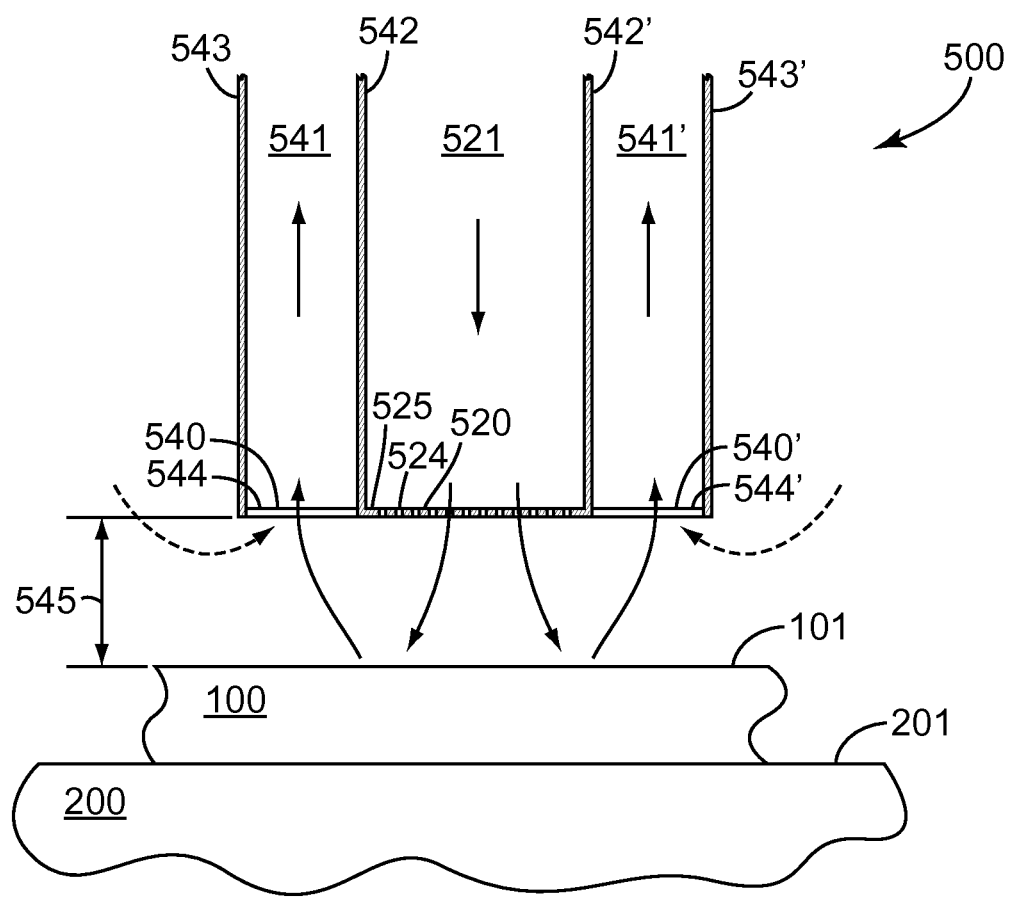

FIGS. 3a, 3b and 3c illustrate embodiments in which working faces 544 and 544' of fluid capture inlets 540 and 540' are open and do not comprise a perforated screen or any other type of fluid-permeable sheet. In such instances, the working face of a fluid capture inlet may be defined primarily by the terminal ends of partitions. For example, working face 544 may be defined at least in part with by terminal ends of partitions 543 and 542, e.g. in combination with terminal ends of laterally extending partitions not shown in FIG. 3, such as housing 415 shown in FIG. 2) However, in various embodiments, a fluid-permeable sheet may be provided at the working face of one or more fluid capture inlets. Such a fluid-permeable sheet may comprise similar properties (e.g., of percent open area etc.) as that of a fluid-permeable sheet provided at the working face of the fluid delivery inlet to which the fluid capture outlet is locally positioned, and may be a continuation of the fluid-permeable sheet of the fluid delivery inlet (e.g., as in Example 1). In other embodiments, the fluid-permeable sheet of the fluid capture inlet may comprise different properties, and/or be comprised of different materials, than the fluid-permeable sheet of the fluid delivery inlet.

FIG. 3a illustrates an embodiment in which the configuration of nozzle 500, the distance from nozzle 500 to substrate 100, the velocity of impinging fluid used, etc., combine to provide that substantially all of the fluid that exits outlet 520 and impinges on substrate 100 is captured by inlets 540 and 540' before the impinged fluid is able to penetrate laterally beyond the boundaries of inlets 540 and 540' to any significant extent. This phenomenon is represented by the arrows denoting direction of fluid flow in FIG. 3a. (Of course, some small portion of the fluid that exits outlet 520 may be removed by inlets 540 or 540' before impinging onto substrate 100). FIG. 3b illustrates an embodiment in which nozzle 500 is operated such that some portion of the impinged fluid is able to penetrate laterally beyond the boundaries of inlets 540 and 540' (and hence may locally mix with ambient air to at least a small extent) but in which the suction provided by capture inlets 540 and 540' is sufficiently strong that substantially all of the impinged fluid is still captured by capture inlets 540 and 540'. FIG. 3c illustrates an embodiment in which nozzle 500 is operated such that substantially all of the impinged fluid is captured by capture inlets 540 and 540', and in which some portion of the ambient air is also captured by the capture inlets (flow of ambient air in FIG. 3c is indicated by the dashed arrows). When nozzle 500 is operated in this manner, in various embodiments the volumetric flow rate of captured ambient air can range up to about 10%, up to about 20%, or up to about 40%, of the volumetric flow rate of captured impinged fluid.

Those of ordinary skill in the art will appreciate that by the methods disclosed herein, impinged fluid may be circulated at least slightly laterally beyond the boundaries of the fluid capture inlets and yet still locally captured by the fluid capture inlets and removed. It has been found that adjustment of the design of nozzle 500 and of the operating parameters of the system (e.g., flowrate of fluid, suction applied through the fluid removal channels, etc.) can alter the extent to which the impinged fluid is able to penetrate laterally beyond the boundaries of the fluid capture inlets before being captured by the capture inlets, and/or can alter the extent to which ambient air is captured in addition to the impinged fluid, either of both of which can advantageously enhance the uniformity of the heating experienced by substrate 100.

In considering FIGS. 3a, 3b, and 3c, those of ordinary skill in the art may realize that in these exemplary illustrations, fluid delivery outlet 520 is only bordered by fluid capture inlets 540 and 540' laterally, there being no provision for fluid capture inlets surrounding fluid delivery outlet 520 in the direction of motion of substrate 100 so as to completely surround the perimeter of fluid delivery outlet 520. However, in similar manner as discussed with respect to nozzle 400, and as discussed later with respect to FIG. 4, the inlets and outlets of nozzle 500 may comprise circumferentially elongated arcuate shapes with the elongated axis of the inlets and outlets aligned in the direction of motion of substrate 100. Thus, in various embodiments, the providing of fluid capture inlets 540 and 540' that laterally flank fluid delivery outlet 520 may be sufficient to surround at least about 70%, at least about 80%, or at least about 90%, of the perimeter of fluid delivery outlet 520 with fluid capture inlets. (Those of skill in the art will also appreciate that in using nozzle 500 to bond two substrates as described in further detail in reference to FIG. 4, two fluid delivery outlets, each laterally flanked by fluid capture inlets, may be positioned with their circumferential terminal ends in close proximity, which, for the combined outlets, will further minimize the outlet area that is not bordered by a fluid capture inlet).

As mentioned, in some embodiments a nozzle that is configured to impinge a fluid on a substrate and also to locally capture and remove at least a portion of the impinged fluid may be a single-sided nozzle (described in further detail later herein with regard to FIG. 7), meaning that it only comprises the capability to deliver a heated fluid onto a first substrate, and does not have the capability to deliver a lower-temperature second fluid onto a second substrate (nor to locally capture the impinged second fluid). In such embodiments, representative FIGS. 3a, 3b, and 3c would correspond to an exemplary single-sided nozzle configured to impinge heated fluid on a first substrate 100 and to locally capture a portion of the impinged heated fluid. In other embodiments, a nozzle that is configured to perform local capture of fluids may be a dual-sided nozzle, meaning it is capable of delivering a heated first fluid onto a first substrate (e.g. as described with reference to FIG. 2), and locally capturing the impinged heated first fluid, and is also capable of delivering a lower-temperature second fluid onto a second substrate and locally capturing the impinged lower-temperature second fluid. In such cases, FIGS. 3a, 3b, and 3c may correspond either to a first side of such a dual-sided nozzle, configured to impinge a heated first fluid onto a first substrate and to locally capture a portion of the impinged first fluid, or to a second side of such a dual-sided nozzle, configured to impinge a lower-temperature second fluid onto a second substrate and to locally capture a portion of the impinged second fluid.

A nozzle corresponding to such a dual-sided embodiment is described in further detail with reference to FIG. 4. In the illustrated embodiment, nozzle 500 comprises first fluid delivery outlet 520 with working face 524, outlet 520 being fluidly connected to first fluid delivery channel 521, and being laterally flanked by first fluid capture inlets 540 and 540' which are fluidly connected to first fluid removal channels 541 and 541' (all as described with respect to FIG. 3a).

Nozzle 500 additionally comprises second fluid delivery outlet 550 with working face 554, outlet 550 being fluidly connected to second fluid delivery channel 551, and being laterally flanked by second fluid capture inlets 560 and 560' with working faces 564 and 564' respectively and which are fluidly connected to second fluid removal channels 561 and 561' respectively. All of these features are analogous to nozzle 400 of FIG. 2, with the addition of the fluid capture inlets and the fluid removal channels. As such, fluid delivery channels 521 and 551 may be regarded as substantially equivalent to fluid delivery channels 421 and 431 of nozzle 400, and fluid delivery outlets 520 and 550 can be regarded as substantially equivalent to fluid delivery outlets 420 and 430 of nozzle 400. Thus, it will be understood that relevant descriptions of features of nozzle 400, for example the circumferentially elongated and/or arcuate nature of the outlets, their positioning near the substrate, the arranging of the outlets to form a protruding salient 535, etc., apply in like manner to the features of nozzle 500. In particular, fluid delivery outlets 520 and 550 of nozzle 500 are in diverging relation in the manner previously described. In particular embodiments, fluid capture inlets 540 and 540' may be congruent with fluid delivery outlet 520, all of which may be congruent with adjacent surface 201 of backing roll 200 (that is, the arcuate shape of all of these elements may be similar and generally parallel to each other). Similar considerations apply for fluid capture inlets 560 and 560', and fluid delivery outlet 550, with respect to each other and to surface 206 of backing roll 205.

Figure 4:
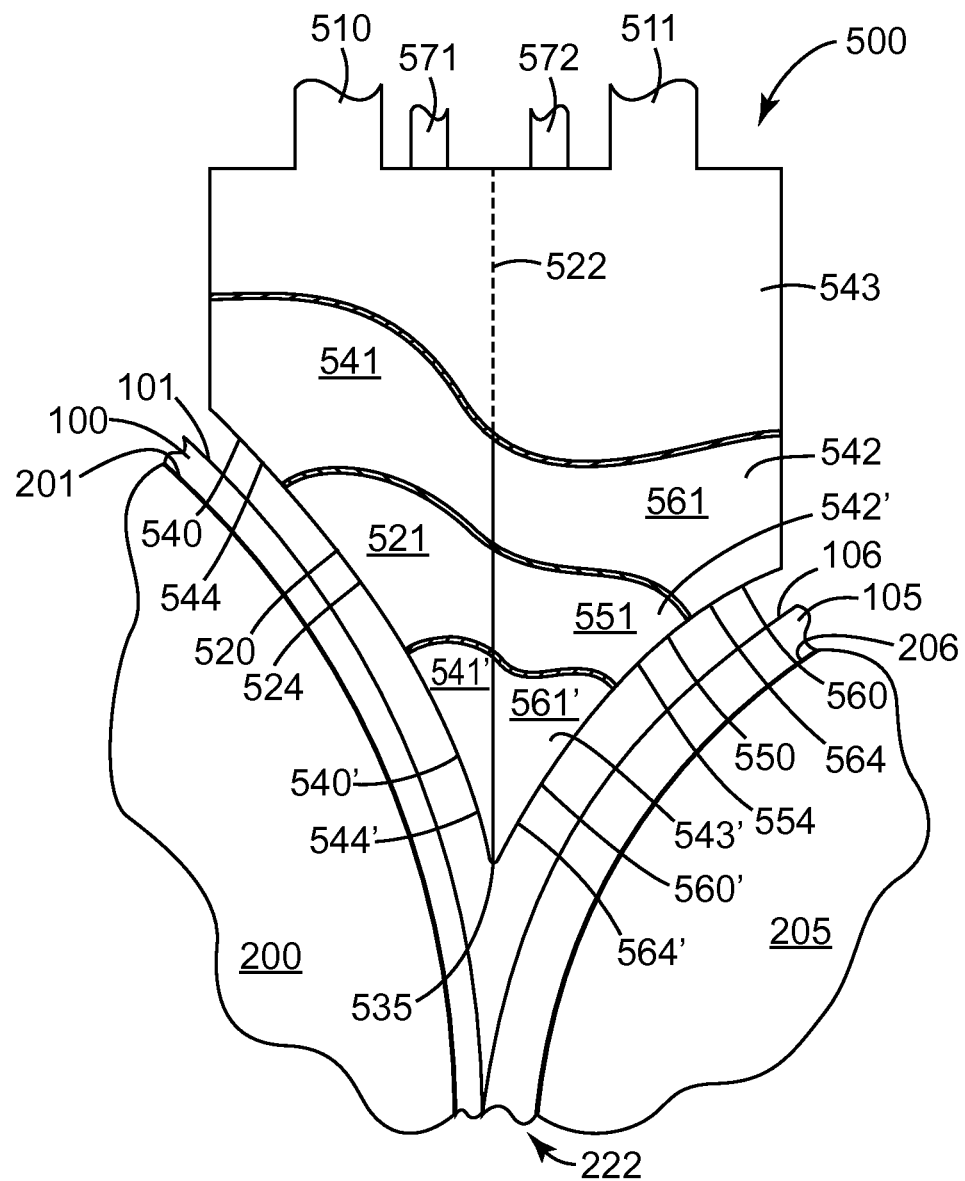
FIG. 4 is a side view in partial cutaway of an exemplary apparatus and process that may be used to impinge at least one fluid onto at least one substrate and to locally remove the impinged fluid.

In nozzle 500 of FIG. 4, partition 522 divides the interior of nozzle 500 into first fluid delivery channel 521, to which heated first fluid may be supplied by supply line 510, and second fluid delivery channel 551, to which lower-temperature second fluid may be supplied by supply line 511.

At least one fluid exhaust line is used to exhaust the locally captured fluid from the fluid removal channels of nozzle 500. In some embodiments, fluid removal channels 541 and 561 may comprise portions of a single fluid removal channel, there being no dividing partition in between. Thus in this embodiment a single fluid exhaust line may be used to exhaust fluid from removal channels 541 and 561. If a partition (e.g., a portion of partition 522) is provided between fluid removal channels 541 and 561, separate fluid exhaust lines 571 and 572 can be provided for each fluid removal channel, as shown in FIG. 4. Similar considerations apply to channels 541' and 561'. Furthermore, if desired, separate fluid exhaust lines can be connected to fluid removal channels 541 and 541'. Alternatively, passages can be provided within nozzle 500 (e.g., passing laterally through fluid delivery channel 521), that interconnect fluid removal channels 541 and 541', so that a single fluid exhaust line can be used for both. Similar considerations apply to channels 561 and 561'.

First fluid delivery outlet 520 may be used to impinge heated first fluid onto first major surface 101 of first moving substrate 100, while substrate 100 is in contact with backing surface 201 (e.g., of backing roll 200). Likewise, fluid delivery outlet 550 may be used to impinge lower-temperature second fluid onto first major surface 106 of second moving substrate 105, while substrate 105 is in contact with backing surface 206 (e.g., of backing roll 205). These operations may be conducted in similar manner as described for nozzle 400, except that fluid capture inlets 540, 540', and 560 and 560' and associated fluid removal channels, etc. are used as described above, to locally capture and remove at least a portion of the impinged fluids.

Figure 5:
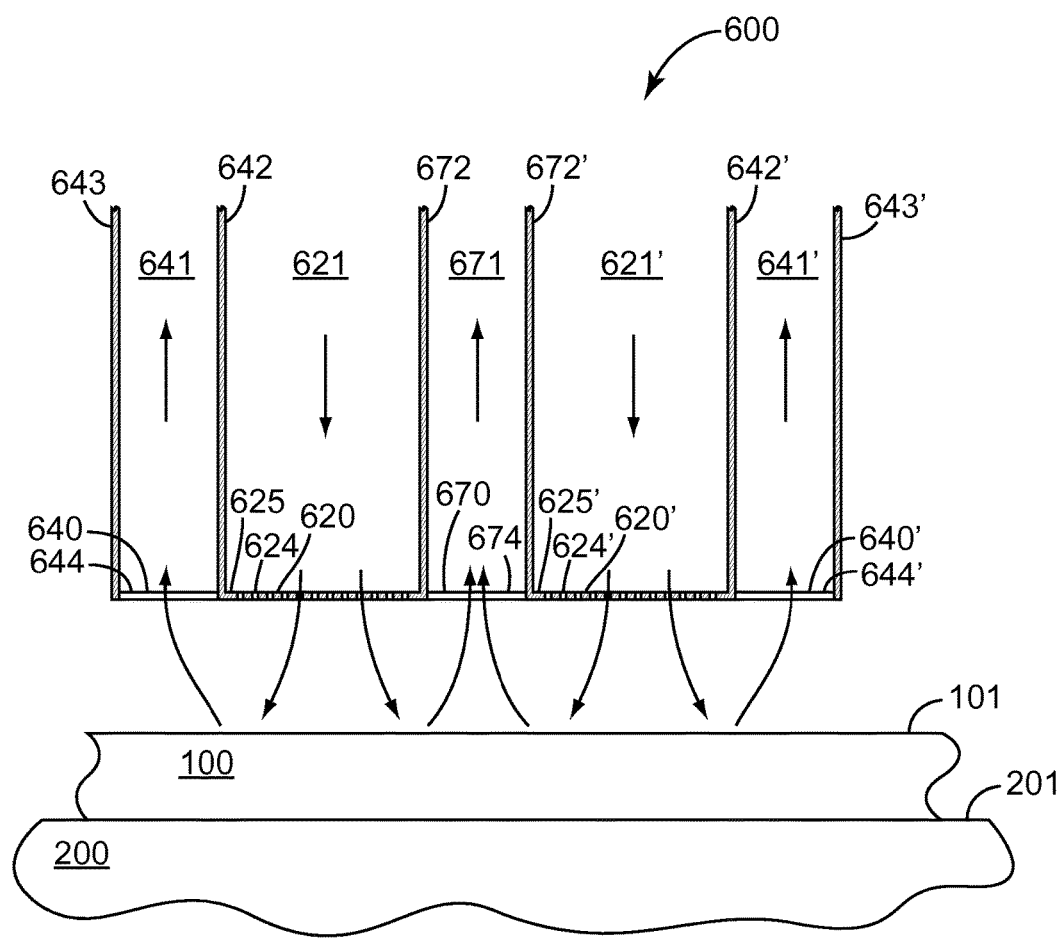
FIG. 5 is a cross sectional diagrammatic illustration of a portion of another exemplary apparatus and process that may be used to impinge a fluid onto a substrate and to locally remove the impinged fluid.

In some cases it may be desirable to provide multiple, laterally spaced fluid delivery outlets each fluidly connected to a fluid delivery channel. As elsewhere herein, laterally signifies a direction transverse to the direction of motion of the substrate upon which the fluid is to be impinged, e.g. along the long axis of a backing roll. FIG. 5 shows such an exemplary configuration, again in the simplified context of a single representative substrate 100 with the direction of substrate motion being out of plane of FIG. 5. Exemplary nozzle 600 comprises first and second laterally spaced fluid delivery outlets 620 and 620' with working faces 624 and 624', respectively, and fluidly connected to fluid delivery channels 621 and 621', respectively. In the illustrated embodiment, working faces 624 and 624' comprise perforated screens 625 and 625', respectively. Outer fluid removal outlets 640 and 640' are provided that laterally outwardly flank fluid delivery outlets 620 and 620'. Also provided is additional, inner fluid capture inlet 670 that is laterally sandwiched in between fluid delivery outlets 620 and 620'. Fluid capture inlets 640, 640', and 670 comprise working faces 644, 644', and 674, respectively, and are fluidly connected to fluid removal channels 641, 641' and 671 respectively. Outer fluid removal channels 641 and 641' are separated from fluid delivery channels 621 and 621' by partitions 642 and 642', respectively. Outer fluid removal channels 641 and 641' are further defined by partitions 643 and 643', respectively, which may comprise part of the housing of nozzle 600 in these locations. Inner fluid removal channel 671 is separated from fluid delivery channels 621 and 621' by partitions 672 and 672', respectively.

The descriptions of the various fluid delivery and removal channels, fluid delivery outlets and fluid capture inlets provided earlier herein with regard to nozzles 400 and 500, are applicable to the various channels, outlets and inlets of nozzle 600. And, of course, while shown (for convenience of description) in FIG. 5 in respect to a single representative substrate 100, it should be understood that when used to impinge a heated first fluid and a lower-temperature second fluid onto first and second moving substrates, respectively, in similar manner as described for nozzle 500 of FIG. 4, nozzle 600 will comprise channels, outlets, inlets, etc., as needed to perform these functions. (That is, the nozzle will comprise a dual-sided nozzle). In particular, nozzle 600 may comprise two laterally spaced pairs of fluid delivery outlets with each outlet of a given pair being in diverging relation, and with the laterally spaced pairs of fluid delivery outlets being laterally outwardly flanked by pairs of fluid capture inlets and having an additional pair of fluid capture inlets laterally sandwiched therebetween. Additionally, it will be understood that representative substrate 100 of FIG. 5 could, in various embodiments and arrangements, represent a first substrate (e.g., substrate 110) onto which a heated fluid is impinged, or a second substrate (e.g., substrate 120) onto which a lower-temperature fluid is impinged.

As illustrated in FIG. 5, at least a portion of fluid exiting working faces 624 and 624' of fluid delivery outlets 620 and 620' and impinging on substrate 100 is locally captured by fluid capture inlets 640, 640' and 670. Those of ordinary skill in the art will appreciate that the interposition of inner fluid capture inlet 670 laterally in between fluid delivery outlets 620 may reduce or eliminate any stagnation points that otherwise may result from the colliding of fluid from the two outlets. Designs of the type depicted in FIG. 5 may provide enhanced uniformity in the heating (or cooling) of wide-width substrates. Additionally, designs of this type may be advantageous in the case in which it is desired to heat a substrate in parallel strips. In such case fluid delivery outlet 620 may be centered generally over one substrate strip, and fluid delivery outlet 620' may be centered over the other.

The basic design of nozzle 600, in which multiple, laterally spaced fluid delivery outlets are used, in which fluid capture inlets are positioned outwardly laterally flanking the fluid delivery outlets, and in which an additional fluid capture inlet is positioned laterally in between the fluid delivery outlets, can be extended as desired. That is, a nozzle may be produced with any number of fluid delivery outlets (with their long axis aligned generally in the direction of motion of the web), laterally interspersed in an alternating manner with fluid capture inlets. As mentioned previously, multiple, physically separate fluid delivery outlets and fluid capture inlets can be provided, to a similar end. Any such design may allow wide-width substrates to be heated by the methods disclosed herein.

Further details concerning the impinging of one or more fluids onto one or more substrates may be found in U.S. patent application Ser. No. 12/974,329, filed Dec. 21, 2010, entitled Apparatus and Methods for Impinging Fluids on Substrates, which is incorporated by reference in its entirety herein.

Figure 6:
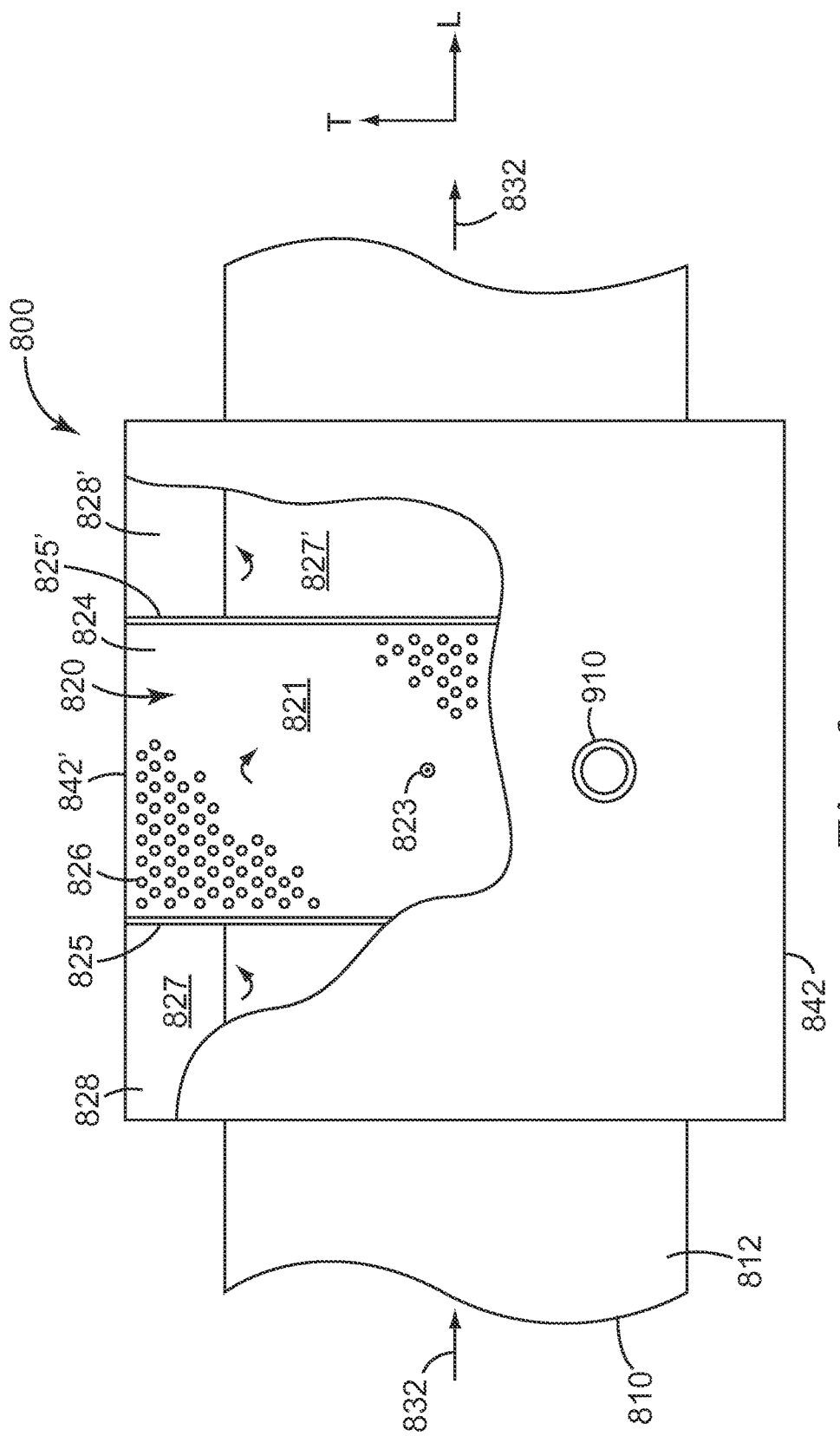
FIG. 6 is a plan view in partial cutaway of a portion of another exemplary apparatus and process that may be used to impinge a fluid onto a substrate and to locally remove the impinged fluid.

A fluid delivery outlet may be positioned at any suitable orientation (e.g., angular orientation) relative to the path of a moving substrate which it is used to impinge a fluid upon. Such orientations may be discussed with reference to the view of FIG. 6, which shows a top plan view, in partial cutaway, looking through a representative nozzle 800 (toward substrate 810) along an axis 823 (i.e., along an axis similar to axis 423 of FIG. 2). In FIG. 6, any slight curvature of the fluid delivery outlets, inlets, etc., is disregarded for clarity of presentation. Nozzle 800 comprises fluid delivery outlet 820 and fluid delivery channel 821, defined by walls 842 and 842' and by partitions 825 and 825' which separate fluid delivery channel 821 from fluid removal channels 827 and 827', with fluid being supplied to fluid delivery channel 821 via fluid supply line 910. Fluid delivery outlet 820 comprises working face 824 (defined by perforated screen 826) through which a fluid may be impinged onto first major surface 812 of substrate 810. Impinged fluid may be captured by fluid capture inlets 828 and 828' and removed therefrom by fluid removal channels 827 and 827' and exhausted therefrom by fluid exhaust lines (not shown).

In some embodiments, a fluid delivery outlet 820 may comprise a long axis, as is evident in FIG. 6. The long axis of a fluid delivery outlet may be oriented at any suitable angle with respect to the path 832 of the substrate onto which it impinges fluid (and thus to the long axis "L" of substrate 810). In some embodiments, the long axis of fluid delivery outlet 820 may be generally aligned (i.e., at an angular orientation within plus or minus 5 degrees of) with long axis "L" of substrate 810. In other embodiments, the long axis of fluid delivery outlet 820 may be at an oblique angle with respect to the long axis "L" of substrate 810. As defined herein, an oblique angle means that the long axis of a fluid delivery outlet is oriented at least 20 degrees away (in a plus or minus, that is clockwise or counterclockwise direction) from the substrate path and from the long axis "L" of the substrate. In some embodiments, the long axis of fluid delivery outlet 820 is oriented approximately transversely to the substrate path, meaning that the long axis of the fluid delivery outlet is oriented within plus or minus 20 degrees of the transverse axis "T" of substrate 810 (and thus may be oriented at an angle of about e.g. 70 to 110 degrees away from the long axis "L" of substrate 810). In some embodiments, the long axis of fluid delivery outlet 820 is oriented transversely to the substrate path, meaning that the long axis of the fluid delivery outlet is oriented within plus or minus about 3 degrees of the transverse axis of substrate 810 (and thus may be oriented at an angle of about e.g. 87 to 93 degrees away from the long axis of substrate 810), as depicted in the particular embodiment illustrated in FIG. 6.

It will be noted that FIG. 6 is arranged for clarity of generic presentation of the concept of the orientation of a fluid delivery outlet relative to a moving substrate. The view shown in FIG. 6 thus may be of a single-sided nozzle or a portion thereof, or of one side, or a portion thereof, of a dual-sided nozzle. Such a nozzle, or side of a dual-sided nozzle, may have multiple fluid delivery outlets as described elsewhere herein. As such, nozzle 800 may have any of the other features and functions discussed elsewhere herein. Representative substrate 810 may correspond to a first substrate 110 (upon which heated first fluid is impinged), or to a second substrate 120 (upon which lower-temperature second fluid may be impinged).

Further details concerning the orientation of fluid delivery outlets relative to the long axis and/or pathway of a substrate upon which a fluid is impinged, may be found in U.S. patent application Ser. No. 13/029,155, filed Feb. 17, 2011, entitled Apparatus and Methods for Impinging Fluids on Substrates, which is incorporated by reference in its entirety for this purpose herein.

Those of ordinary skill will appreciate that many variations of the above-discussed arrangements and conditions may be employed. For example, in some embodiments a dual-sided nozzle may be used, of the general type illustrated in FIGS. 2 and 4, with the first side of the nozzle being used to impinge a heated first fluid upon a first substrate, and with the second side of the nozzle being used to impinge a lower-temperature second fluid upon a second substrate (with the temperature, flowrate, etc. of the two fluids being independently controlled as desired). In various embodiments, the impinged lower-temperature second fluid may be a heated fluid (although remaining more than 100 degrees C. lower than the temperature of the heated first fluid, as defined herein), may be an ambient-temperature fluid (e.g., air), or may be a cooled fluid. At least a portion of the impinged lower-temperature second fluid may be locally removed if desired, by way of the apparatus, arrangements and methods disclosed earlier herein.

In other embodiments, a nozzle capable of dual-sided use may be employed, but the impingement of lower-temperature second fluid onto the second substrate may be restricted or even completely eliminated. This may be performed e.g. by closing a shutter on the working face of the second fluid delivery outlet(s) as mentioned earlier herein, by closing a valve anywhere along the second fluid delivery channel(s), by not supplying any second fluid to the nozzle through a second fluid supply line, or by any suitable method of blocking or eliminating the flow of the second fluid. If the delivery of lower-temperature second fluid from such a nozzle is completely eliminated, the contacting of a second substrate with a lower temperature fluid may occur via use of a conventional blower or the like, or simply by way of the motion of the second substrate through the ambient atmosphere within which the apparatus is located. In various embodiments, a conventionally-delivered (i.e., without local removal) lower-temperature second fluid may be a heated fluid (although remaining more than 100 degrees C. lower than the temperature of the heated first fluid, as disclosed herein), may be an ambient-temperature fluid (e.g., air), or may be a cooled fluid.

Figure 7:
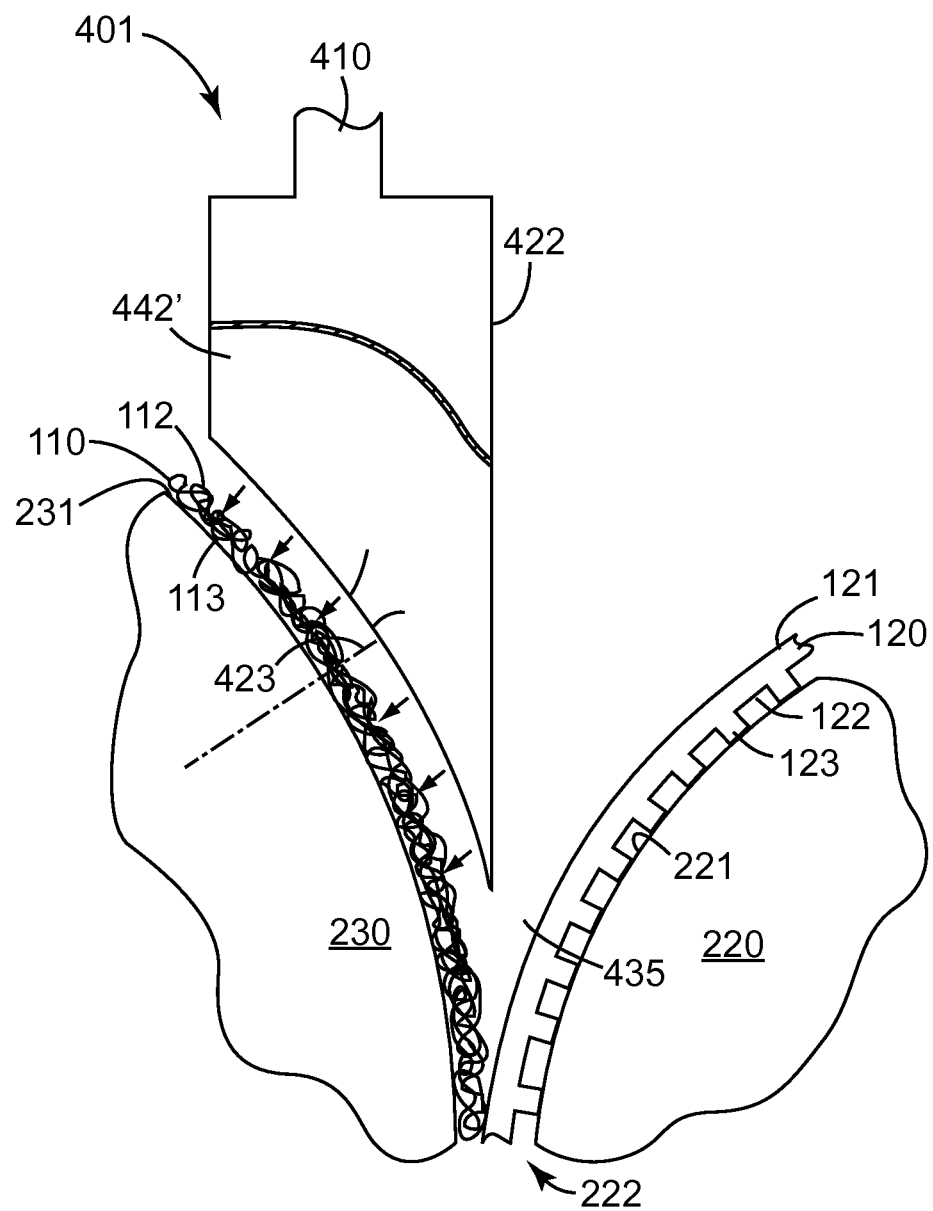
FIG. 7 is a side view in partial cutaway of an exemplary apparatus and process that may be used to impinge a fluid onto a substrate and to locally remove the impinged fluid.

In other embodiments, a nozzle may be used which is a "single-sided nozzle", as shown in generic representation as nozzle 401 of FIG. 7, with all features and descriptions thereof generally corresponding to like-numbered features in FIG. 2, except that in this case wall 422, rather than being a partition that separates fluid supply channels of the two sides of a dual-sided nozzle, may be an external wall of a single-sided nozzle. Such a single-sided nozzle may only serve to impinge fluid (e.g. heated fluid) onto a first substrate, such that contacting of a second substrate with a lower temperature fluid may occur via use of a conventional blower or the like, or simply by way of the motion of the second substrate through the ambient atmosphere within which the apparatus is located. It will be understood that such a single-sided nozzle may comprise any of the features, arrangements and functionalities described elsewhere herein. (For clarity of presentation of the fluid-delivery structures, fluid-capture and fluid-removal structures are not shown in FIG. 7). Once again, the conventionally-delivered lower-temperature second fluid may be a heated fluid (although remaining more than 100 degrees C. lower than the temperature of the heated first fluid, as disclosed herein), may be an ambient-temperature fluid (e.g., air), or may be a cooled fluid.

The apparatus and methods disclosed herein may be used e.g. to facilitate the melt-bonding of the surfaces of two substrates to each other. In particular, they may be used to surface-bond a first, fibrous substrate to another, second substrate to make a surface-bonded laminate. By this is meant that the fibrous substrate may be attached to the second substrate by way of some the fibers of a first surface of the fibrous substrate being surface-bonded to a first surface of the second substrate. The designation that fibers of the first substrate are surface-bonded to the first major surface of the second substrate means that parts of the surfaces of at least some fiber portions are melt-bonded to the first surface of the second substrate, in such a manner as to substantially preserve the original (pre-bonded) shape of the first major surface of the second substrate, and to substantially preserve at least some portions of the first major surface of the second substrate in an exposed condition, in the surface-bonded area.

The requirement that surface bonding substantially preserves the original shape of the first major surface means that surface-bonded fibers may be distinguished from fibers that are bonded to a substrate in a manner that results in fiber portions being embedded (e.g., partially or completely encapsulated) within the substrate by way of at least partial penetration of the fibers into the substrate, deformation of the substrate, and the like. The requirement that surface bonding substantially preserves at least some portions of the first major surface of the second substrate in an exposed condition means that surface-bonded fibers may be distinguished from fibers that are bonded to a second substrate in a manner that results in the fibers being sufficiently melted, densified, compacted, commingled etc., so as to form a continuous bond. By continuous bond is meant that fibers immediately adjacent to the first major surface of the second substrate have commingled and/or densified sufficiently (e.g., melted together so as to partially or completely lose their identity as individual fibers) to form a continuous layer of material atop, and in contact with, the first major surface. Those of ordinary skill in the art will appreciate that fibrous webs that are bonded to substrates that are still in a molten, semi-molten, soft, etc. state, (such as extruded materials that have not yet cooled e.g. to a solid condition), may not comprise surface bonding, since bonding to a substrate that is still at such a high temperature and/or is still considerably deformable, may cause the fibers to become embedded, may cause the formation of a continuous bond, or both.

Although particularly useful in the bonding of a fibrous substrate to a film substrate (e.g., in order to form a surface-bonded laminate as described above), the apparatus and methods disclosed herein can be used to melt-bond any two suitable substrates to each other. It should also be understood that, although discussions herein have focused primarily on the representative configuration in which a first substrate (upon whose first surface a heated first fluid is impinged) is a fibrous substrate, and a second substrate (whose first surface is contacted with a lower-temperature second fluid) is a film substrate, the substrate roles may be swapped if desired. Suitable substrates may be made of any suitable thermoplastic polymeric material (e.g., a material that is melt-bondable). Such materials may include e.g. polyolefins, polyesters, polyamides, and various other materials. Examples of suitable polyolefins include polyethylene, polypropylene, polybutylene, ethylene copolymers, propylene copolymers, butylene copolymers, and copolymers and blends of these materials. The substrate may comprise various additives and the like, as are well known in the art, as long as such additives do not unacceptably reduce the ability of the substrate to be melt bonded. If the substrate comprises a film substrate, it may be a multilayer substrate, e.g. a coextruded multilayer film, as long as a first major surface of an outermost layer of the multilayer substrate is able to be melt-bonded to another substrate. In some embodiments, one or both of the substrates to be bonded may comprise a preformed substrate, by which is meant that it is a pre-existing, previously-made substrate (e.g., film, nonwoven web, etc.) whose physical properties have generally fully developed. This should be contrasted e.g. with a case in which a substrate is made (e.g., extruded) and taken generally directly into the herein-described bonding process in a condition in which it is still generally molten, semi-molten, soft, or the like.

Suitable substrates may be any desired thickness. In various embodiments, the thickness of a substrate (not including the height of any protrusions) may be less than about 400 microns, less than about 200 microns, less than about 100 microns, or less than about 50 microns. In some embodiments, a substrate to be bonded does not comprise any adhesive (i.e., hot melt adhesive, pressure sensitive adhesive, and the like) e.g. in the form of coatings on a major surface of the web. In some embodiments, a substrate may be continuous, i.e. without any through-penetrating holes. In other embodiments, a substrate may be discontinuous, e.g. comprising through-penetrating perforations and the like. In some embodiments, a substrate may be comprised of a dense, nonporous material. In some embodiments, a substrate may be comprised of a porous material. In particular embodiments, a substrate may comprise a fibrous web, e.g. a nonwoven fibrous web.

In some embodiments, a first major surface and a second, oppositely-facing major surface of a substrate may be free of protrusions. In other embodiments, optional protrusions may protrude from a second major surface of the substrate, e.g., the surface opposite the surface which is to be melt-bonded to another substrate by the apparatus and methods disclosed herein. Such protrusions can be of any desired type, shape or design, present at any desired density per area of substrate, as desired for any suitable purpose. Such protrusions may be integral with (that is, of the same composition, and formed at the same time with as a unit) the substrate. In some embodiments, such protrusions may comprise male fastening elements, e.g. hooks, of the type that are capable of engaging with a fibrous material and which can serve as the hook component of a so-called hook and loop fastening system. Any such male fastening elements can be used. In particular embodiments, fastening elements may be used that each comprise a stem and a relatively large head (that may be e.g. generally mushroom-shaped, a flattened disc, and the like), of the general type described in U.S. Pat. Nos. 6,558,602, 5,077,870, and 4,894,060. Suitable substrates with protrusions comprising male fastening elements include e.g. those products available from 3M Company, St. Paul, Minn., under the trade designation CS200 and CS 600. Other suitable substrates include e.g. those described in U.S. Pat. Nos. 7,067,185 and 7,048,984.

If a substrate to be bonded is a fibrous substrate, it may be any suitable fibrous web with sufficient mechanical strength to be handled as a self-supporting web and to be subjected to the bonding processes described herein. In some embodiments, such a fibrous web may comprise interlaced fibers such as achieved by weaving, knitting, stitching and the like. As such, a fibrous web may be comprised of a suitable fabric or textile, as long as the materials comprising the fibers are suitable for the herein-described bonding. In some embodiments, the fibrous web comprises a nonwoven fibrous web. Any suitable self-supporting nonwoven fibrous web may be used, made of any material as desired, as long as the herein-described bonding can be performed. Such a nonwoven fibrous web may be e.g. a carded web, spunbonded web, a spunlaced web, an airlaid web, or a meltblown web (i.e., as long as such a web has undergone sufficient processing as to render it self-supporting). Such a nonwoven fibrous web may be a multilayer material with, for example, at least one layer of a meltblown web and at least one layer of a spunbonded web, or any other suitable combination of nonwoven webs. For instance, it may be a spunbond-meltbond-spunbond, spunbond-spunbond, or spunbond-spunbond-spunbond multilayer material. Or, the web may be a composite web comprising a nonwoven layer and a dense film layer, as exemplified by webs comprising nonwoven fibers bonded in arcuately protruding loops to a dense film backing and available from 3M Company, St. Paul, Minn., under the trade designation Extrusion Bonded Loop.

Such a fibrous web may be made of any suitable thermoplastic polymeric material (e.g., a material that is melt-bondable). Such materials may include e.g. polyolefins, polyesters, polyamides, and various other materials. Examples of suitable polyolefins include polyethylene, polypropylene, polybutylene, ethylene copolymers, propylene copolymers, butylene copolymers, and copolymers and blends of these materials. In some embodiments, some or all of the fibers of the web may comprise monocomponent fibers. In some embodiments, the fibrous web may also or instead comprise bicomponent fibers, e.g., that comprise a sheath of lower-melting material surrounding a core of higher melting material. If desired, the sheath material may be chosen so as to enhance its ability to melt-bond to another substrate. Other fibers (e.g., staple fibers and the like) may be present. In some embodiments, the fibrous web does not comprise any adhesive (i.e., hot melt adhesive, pressure sensitive adhesive, and the like) as might be present in the form of adhesive particles, binder or the like, distributed throughout the web or on a major surface of the web.

Further details concerning surface bonding of substrates and properties of surface-bonded substrates may be found in U.S. patent application Ser. No. 12/974,536, filed Dec. 21, 2010, entitled Bonded Substrates and Methods for Bonding Substrates, which is incorporated by reference in its entirety for this purpose herein.

LIST OF EXEMPLARY EMBODIMENTS

Embodiment 1

A method of impinging a heated first fluid onto a first surface of a first moving substrate, and locally removing at least a portion of the impinged heated first fluid, and bonding the first surface of the first moving substrate to a first surface of a second moving substrate, the method comprising: providing at least one first fluid delivery outlet and at least one first fluid capture inlet that is locally positioned relative to the first fluid delivery outlet; passing the first moving substrate by the first fluid delivery outlet and impinging a heated first fluid from the first fluid delivery outlet onto the first surface of the first moving substrate so that the first surface of the first substrate is a heated surface; locally capturing at least 60% of the volumetric flow of impinged first fluid by way of the at least one first fluid capture inlet and removing the locally captured first fluid through at least one first fluid removal channel that is fluidly connected to the first fluid capture inlet; contacting a first surface of a second moving substrate with a second fluid that is at least 100 degrees C. lower in temperature than the temperature of the heated first fluid; and, contacting the heated first surface of the first substrate with the first surface of the second substrate so that the first surface of the first substrate and the first surface of the second substrate melt-bond to each other.

Embodiment 2

The method of embodiment 1 wherein the second fluid is ambient-temperature, quiescent air that is contacted with the first surface of the second substrate by way of the second moving substrate being moved through the ambient-temperature quiescent air.

Embodiment 3

The method of embodiment 1 wherein the second fluid is an ambient-temperature fluid that is impinged onto the first surface of the second substrate.

Embodiment 4

The method of embodiment 1 wherein the second fluid is a heated fluid that is impinged onto the first surface of the second substrate.

Embodiment 5

The method of embodiment 1 wherein the second fluid is a cooled fluid that is impinged onto the first surface of the second substrate.

Embodiment 6

The method of any of embodiments 1-5 comprising locally capturing at least 80% of the volumetric flow of the impinged first fluid.

Embodiment 7

The method of any of embodiments 1-6 comprising locally capturing substantially all of the volumetric flow of the impinged first fluid.

Embodiment 8

The method of any of embodiments 1-7 wherein the nominal velocity of the heated first fluid passing through the at least one first fluid delivery outlet is less than 0.2 Mach.

Embodiment 9

The method of any of embodiments 1-8 wherein the at least one first fluid delivery outlet and the at least one first fluid capture inlet are each positioned less than 5 mm from the first surface of the first moving substrate.

Embodiment 10

The method of any of embodiments 1-9 wherein the at least one first fluid delivery outlet comprises an elongated shape with a long axis, and wherein a pair of first fluid capture inlets, each with an elongated shape with a long axis, are positioned in a laterally outwardly flanking relationship with the first fluid delivery outlet, with the long axis of the first fluid capture inlets being generally parallel to the long axis of the first fluid delivery outlet, and wherein the long axis of the first fluid capture inlets and of the first fluid delivery outlet are generally aligned with the direction of motion of the first substrate.

Embodiment 11

The method of embodiment 10 wherein the at least one first fluid delivery outlet is one of a pair of laterally-spaced first fluid delivery outlets, with the pair of first fluid capture inlets laterally outwardly flanking the pair of first fluid delivery outlets and with an additional first fluid capture inlet laterally sandwiched between the pair of first fluid delivery outlets.

Embodiment 12

The method of any of embodiments 1-11 wherein the first moving substrate comprises a long axis, wherein the at least one first fluid delivery outlet comprises an elongated shape with a long axis, and wherein the long axis of the at least one first fluid delivery outlet is generally aligned with the long axis of the first substrate.

Embodiment 13

The method of any of embodiments 1-12 wherein the first moving substrate comprises a long axis, wherein the at least one first fluid delivery outlet comprises an elongated shape with a long axis, and wherein the long axis of the at least one first fluid delivery outlet is oriented transversely to the long axis of the first substrate.

Embodiment 14

The method of any of embodiments 1-13 wherein the first moving substrate is in contact with the surface of a first backing roll and the second moving substrate is in contact with the surface of a second backing roll, and wherein the first fluid delivery outlet comprises an arcuate shape generally congruent with the surface of the first backing roll, and wherein the surface of the first backing roll, and the surface of the second backing roll, respectively carry the first and second substrates along converging paths toward each other and into contact with each other so that the melt-bonding can be performed.

Embodiment 15

The method of any of embodiments 1-14 wherein the first substrate comprises a polymer film and wherein the second substrate comprises a nonwoven fibrous web.

Embodiment 16

The method of any of embodiments 1-15 wherein the first substrate comprises a nonwoven fibrous web and wherein the second substrate comprises a polymer film.

Embodiment 17

The method of any of embodiments 1 and 3-16 wherein the method further comprises providing at least one second fluid delivery outlet and at least one second fluid capture inlet that is locally positioned relative to the second fluid delivery outlet; passing the second moving substrate by the second fluid delivery outlet and impinging a lower-temperature second fluid, that is at least 100 degrees C. lower in temperature than the temperature of the heated first fluid, from the second fluid delivery outlet onto the first surface of the second moving substrate; locally capturing at least 60% of the total volumetric flow of impinged second fluid by way of the at least one second fluid capture inlet and removing the locally captured second fluid through a least one second fluid removal channel that is fluidly connected to the second fluid capture inlet.

Embodiment 18

The method of embodiment 17 wherein the at least one first fluid delivery outlet and the at least one second fluid delivery outlet are in diverging relation.

Embodiment 19

An apparatus for impinging a heated first fluid onto a first surface of a first moving substrate, and locally removing at least a portion of the impinged heated first fluid, and bonding the first surface of the first moving substrate to a first surface of a second moving substrate, the apparatus comprising: at least one first fluid delivery outlet and at least one first fluid capture inlet that is locally positioned relative to the first fluid delivery outlet; a first backing surface configured to support the first moving substrate and to carry the first moving substrate by the first fluid delivery outlet so that a heated first fluid that is delivered from the first fluid delivery outlet is impinged upon the first surface of the first moving substrate so that it is a heated first surface; and, a second backing surface configured to support the second moving substrate and to carry the second moving substrate along a converging path which brings the first major surface of the second moving substrate into contact with the heated first surface of the first moving substrate.

Embodiment 20

The apparatus of embodiment 19 wherein the first fluid delivery outlet comprises a circumferentially elongated arcuate shape and wherein the first fluid capture inlet comprises a circumferentially elongated arcuate shape that is congruent with that of the heated first fluid capture inlet.

Embodiment 21

The apparatus of any of embodiments 19-20 wherein the first fluid delivery outlet is laterally outwardly flanked by a pair of first fluid capture inlets that are both congruent with the first fluid delivery outlet.

Embodiment 22

The apparatus of any of embodiments 19-21 wherein the apparatus comprises a laterally-spaced pair of first fluid delivery outlets, with a pair of first fluid capture inlets laterally outwardly flanking the pair of first fluid delivery outlets and with an additional first fluid capture inlet laterally sandwiched between the pair of first fluid delivery outlets.

Embodiment 23

The apparatus of any of embodiments 19-22 wherein the apparatus comprises at least three laterally-spaced first fluid delivery outlets, with a first fluid capture inlet laterally sandwiched in between each two first fluid delivery outlets, and with a set of first fluid capture inlets laterally outwardly flanking the laterally outermost first fluid delivery outlets.

Embodiment 24

The apparatus of any of embodiments 19-23 wherein each of the at least one fluid delivery outlets comprises a working face comprising a fluid-permeable sheet comprising a discontinuous screen with through-openings providing the sheet with a percent open area of between 20% and 80%.

Embodiment 25

The apparatus of any of embodiments 19-24 wherein the first backing surface comprises the surface of a first backing roll and wherein the second backing surface comprises the surface of a second backing roll, the first and second backing rolls collectively comprising a nip-roll pair that establishes a converging pathway for the first and second substrates, and wherein the first fluid delivery outlet comprises an arcuate shape generally congruent with the surface of the first backing roll.

Example

A first substrate was obtained from 3M Company, St. Paul, Minn. under the trade designation CS600 (of the general type described in U.S. Pat. No. 6,000,106). The first surface of the first substrate was generally smooth and the second surface of the first substrate bore protrusions at a density of approximately 2300 per square inch, (with the protrusions being male fastening elements each with an enlarged, generally disc-shaped head). The thickness of the substrate was approximately 100 microns (not counting the height of the protrusions) and the height of the protrusions was approximately 380 microns. The backing and protrusions were of integral construction and were both comprised of polypropylene/polyethylene copolymer. The first substrate was obtained as elongated strips each of 15 mm width. A second substrate was obtained that was a spunbond nonwoven web available from First Quality Nonwovens under the trade designation Spunbond 64.4 gsm (Pillow Bond). The web was 64.4 gsm with a point bonded pattern believed to be in the range of approximately 15% bonded area and a width of 110 mm, and was comprised of polypropylene.

A web handling apparatus with lamination nip was setup in similar manner to that that shown in FIG. 1. Two elongated strip (first substrates) were bonded to the first surface of a single nonwoven web (second substrate) as described herein. While for convenience the following description may occasionally be phrased in terms of one first substrate, it will be understood that two identical first substrates were identically handled, traveling in parallel.

In using the apparatus, the first substrates were guided onto a 10.2 cm radius chrome preheat roll (analogous to roll 210 of FIG. 1) with the first surface of the substrate (that is, the surface opposite the surface bearing the protrusions) contacting the surface of the preheat roll. The preheat roll was internally heated by hot oil to comprise a nominal surface temperature of approximately 76 degrees C. Upon attainment of steady state operating conditions, the first surface of a first substrate was found to attain a temperature of approximately 73 degrees C. (as monitored by a non-contact thermal measurement device).

From the preheat roll the first substrates traversed a distance of approximately 5.1 cm to a first backing roll (analogous to roll 220 of FIG. 1) of 3.2 cm radius, which was not actively cooled or heated. On its surface the roll comprised a nominal 0.64 cm thick layer of silicone rubber impregnated with aluminum particles. The surface layer comprised a Shore A hardness of 60. The surface layer comprised two elevated plateaus that circumferentially extended completely around the roll (the plateaus were elevated approximately 2.2 mm above the surrounding surface of the roll), each of lateral width approximately 16 mm, with the lateral distance (across the face of the roll, in a direction aligned with the long axis of the roll) between their near edges of approximately 10 mm. The parallel-traveling first substrates were guided onto the plateaus of the first backing roll so that the mushroom-shaped heads of the protrusions on the second surface of the substrate contacted the plateau surface. (The substrates were elevated on plateaus to minimize the chances of the nonwoven web contacting the surface the first backing roll.) After thus contacting the surface of the first backing roll, the substrates circumferentially traversed an arc of approximately 180 degrees around the first backing roll to be heated and bonded as described herein.

In using the apparatus, the nonwoven web second substrate was guided onto a second backing roll, of 10.2 cm radius (analogous to roll 230 of FIG. 1). The second backing roll comprised a metal surface and was not actively cooled or heated. The nonwoven web circumferentially traversed an arc of approximately 90 degrees around the second backing roll to be bonded as described herein. The path of the nonwoven web was aligned with the paths of the two first substrate strips so that when the two substrates contacted the nonwoven web in the nip between the two backing rolls, the substrate strips were aligned downweb with the nonwoven web.

The backing rolls were positioned in a horizontal stack, similar to the arrangement shown in FIG. 1. A heated-air impingement nozzle capable of local capture/removal of impinged air was placed vertically above the backing roll stack, adjacent the nip, in analogous manner to the placement of nozzle 400 in FIG. 1. As viewed from the side along an axis transverse to the web movement (i.e., as viewed in FIG. 1), the nozzle comprised a first working face and a second working face, with the first and second working faces being in diverging relation (as defined earlier herein). Each face comprised a generally cylindrical section, with the curvature of the first face generally matching the curvature of the first backing roll (with the radius of curvature of the first face being approximately 3.2 cm) and the curvature of the second face generally matching the curvature of the second backing roll (with the radius of curvature of the second face being approximately 10.2 cm). The circumferential length of the first working face was set at approximately 75 mm. The circumferential length of the second working face was set at approximately 0 mm, by means of a sliding damper (proximate the second working face of the nozzle) that was completely closed off, so as to essentially completely eliminate the impingement of heated air onto the second substrate (the nonwoven web), as described in further detail below. The two working faces met at a protruding salient analogous to salient 435 of FIG. 2.

As viewed from a direction aligned with the movement of the two substrate strips, the first diverging face of the nozzle comprised two air delivery outlets, each of lateral width approximately 16 mm. The two air delivery outlets were laterally outwardly flanked by two air capture inlets, each of lateral width approximately 26 mm. Sandwiched laterally in between the two air delivery outlets was an additional air capture inlet, of lateral width approximately 4 mm. No perforated metal outlet plate used in this configuration. Thus, the first face of the nozzle comprised a configuration analogous to that shown in FIG. 5, except that no perforated metal screen was present on a working face of any of the air-capture inlets or air-delivery outlets.

When viewed from a direction aligned with the movement of the nonwoven web, the second diverging face of the nozzle comprised a similar arrangement of two air delivery outlets, two laterally flanking air capture inlets, and one laterally sandwiched air capture inlet. The lateral widths of the outlets and inlets were the same as for the first diverging surface. The second diverging surface comprised an adjustable shutter that extended laterally so as to laterally cover the width of both air delivery outlets, and that could be moved circumferentially along the working surfaces of the air delivery outlets so as to control the circumferential length of the air delivery outlets. The shutter also extended across the lateral width of all three fluid capture inlets. As mentioned above, the shutter was positioned so that the circumferential length of the air delivery outlets of the second diverging face was effectively approximately 0 mm, with the outlets of the second face thus being essentially completely blocked to prevent flow of heated air. (The fluid capture inlets of this face were likewise blocked by the shutter).

All of the air delivery outlets and inlets of the first and second diverging faces were fluidly connected to air delivery channels and air removal channels, respectively. The air delivery outlets were all fed by the same air delivery conduit attached to the nozzle, so that the first and second substrates would have received air at generally similar temperatures, except that the air flow onto the second substrate was essentially completely eliminated by the above-mentioned shutter. The temperature and volumetric flowrate of the heated air supplied to the nozzle could be controlled as desired (by use of a heater available from Leister, of Kaegiswil, Switzerland, under the trade designation Lufterhitzer 5000). The volumetric rate of removal of captured air (through a removal conduit attached to the nozzle) could be controlled as desired.

The nozzle was positioned close to the first and second backing rolls in a manner analogous to the position of nozzle 400 in FIG. 2. The first diverging face of the nozzle was at a distance estimated to be approximately 1.5 to 2 mm from the surface of the first backing roll, over an arc extending approximately 128 degrees circumferentially around first backing roll. The second diverging face of the nozzle was at a distance estimated to be approximately 1.5 to 2 mm from the surface of the second backing roll, over an arc extending approximately 28 degrees circumferentially around the second backing roll. The protruding salient was centered over the nip (the closest point of contact between the surfaces of the two rolls), again analogous to the configuration shown in FIG. 2.

The heated air supply temperature was measured at 680° F. (360° C.), by use of several thermocouples and associated hardware. The volumetric flow rate of heated air and captured air was determined using a hot wire anemometer and associated hardware. The volumetric flow of heated air was approximately 1.0 cubic meters per minute. With the total area of the air delivery outlets of the first face of the nozzle being approximately 24 $cm^2$, the linear velocity of the heated air at the working face of the outlets was estimated to be approximately 7 meters per second. The return supply volume was approximately 1.14 cubic meters per minute, thus corresponding to capture of ambient air at a volumetric flowrate of approximately 14% of that of the captured impinged air.

The above-described apparatus and methods were used to guide the elongated strip first substrates, and the nonwoven web second substrate, in an arcuate path along the surface of the first and second backing rolls respectively, during which they passed closely by the first and second diverging surfaces (respectively) of the nozzle, with only the first surface of the first substrates being impinged with heated air (with local capture of impinged air). The strip substrates and the nonwoven web then entered the nip between the two backing rolls wherein the (heated) first surfaces of the strip substrates and the first surface of the nonwoven web were brought into contact with each other. The nip between the two backing rolls was set at low pressure, with the pressure estimated to be 15 pli (pounds per linear inch), or approximately 27 N per linear cm. The line speed of the two substrates and of the nonwoven web was set to nominal 40 meters per minute.

After being contacted together, the substrates and the nonwoven web together circumferentially followed the surface of the second backing roll over an arc of approximately 180 degrees before being removed from contact with the backing roll.

This process resulted in the bonding of two parallel strips of the substrate to the first surface of the nonwoven web, with a strip of the first surface of the nonwoven web being exposed between the near edges of the substrate strips, and with strips of the first surface of the nonwoven web exposed beyond the far edges of the strips.

Upon inspection, it was found that the bond between the substrate strips and the nonwoven web was excellent, and that it was difficult to impossible to remove the substrate from the nonwoven web without significantly damaging or destroying one or both. The bonded area extended completely over the area of contact between the substrate and the nonwoven web, including the very edges of the substrate. It was also noted that the second surface of the nonwoven web (the surface opposite the surface to which the substrate was bonded) in areas where the substrate was bonded did not differ significantly from areas without the substrate. That is, it did not appear that the bonding process significantly altered the loft, density, or appearance of the nonwoven web. It was also noted that the bonding process did not appear to affect or alter the protruding male fastening elements. That is, no physical damage or deformation of the elements was noted. Qualitatively, no difference was observed in the loft of the fibrous web as a result of having undergone the bonding process. Qualitatively, no difference was observed in engagement performance of the fastening elements with fibrous materials as a result of having undergone the bonding process. Upon close inspection, the nonwoven web and the substrate were observed to be surface-bonded together, as described herein.

The tests and test results described above are intended solely to be illustrative, rather than predictive, and variations in the testing procedure can be expected to yield different results. All quantitative values in the Examples section are understood to be approximate in view of the commonly known tolerances involved in the procedures used. The foregoing detailed description and examples have been given for clarity of understanding only. No unnecessary limitations are to be understood therefrom.

It will be apparent to those skilled in the art that the specific exemplary structures, features, details, configurations, etc., that are disclosed herein can be modified and/or combined in numerous embodiments. All such variations and combinations are contemplated by the inventor as being within the bounds of the conceived invention. Thus, the scope of the present invention should not be limited to the specific illustrative structures described herein, but rather by the structures described by the language of the claims, and the equivalents of those structures. To the extent that there is a conflict or discrepancy between this specification and the disclosure in any document incorporated by reference herein, this specification will control.

What is claimed is:

1. A process of making a laminated product by impinging a heated first fluid onto a first surface of a first moving substrate, and locally removing at least a portion of the impinged heated first fluid, and bonding the first surface of the first moving substrate to a first surface of a second moving substrate, the process comprising:

providing at least one first fluid delivery outlet and at least one first fluid capture inlet that is locally positioned relative to the first fluid delivery outlet;

passing the first moving substrate by the at least one first fluid delivery outlet and impinging a heated first fluid from the at least one first fluid delivery outlet onto the first surface of the first moving substrate so that the first surface of the first substrate is a heated surface;

locally capturing at least 60% of the volumetric flow of impinged first fluid by way of the at least one first fluid capture inlet and removing the locally captured first fluid through at least one first fluid removal channel that is fluidly connected to the at least one first fluid capture inlet;

contacting a first surface of a second moving substrate with a second fluid that is at least 100 degrees C. lower in temperature than the temperature of the heated first fluid so that the first surface of the second substrate is a lower temperature surface than the heated surface of the first substrate; and, contacting the heated first surface of the first substrate with the lower temperature first surface of the second substrate so that the first surface of the first substrate and the first surface of the second substrate melt-bond to each other, wherein the second fluid is ambient-temperature, quiescent air that is contacted with the first surface of the second substrate by way of the second moving substrate being moved through the ambient-temperature quiescent air and wherein the nominal velocity of the heated first fluid passing through the at least one first fluid delivery outlet is less than 0.2 Mach.

2. The process of claim 1 wherein the at least one first fluid delivery outlet and the at least one first fluid capture inlet are each positioned less than 5 mm from the first surface of the first moving substrate.

3. The process of claim 1 wherein the at least one first fluid delivery outlet comprises an elongated shape with a long axis, and wherein a pair of first fluid capture inlets, each with an elongated shape with a long axis, are positioned in a laterally outwardly flanking relationship with the first fluid delivery outlet, with the long axis of the first fluid capture inlets being generally parallel to the long axis of the first fluid delivery outlet, and wherein the long axis of the first fluid capture inlets and of the first fluid delivery outlet are generally aligned with the direction of motion of the first substrate.

4. The process of claim 3 wherein the at least one first fluid delivery outlet is one of a pair of laterally-spaced first fluid delivery outlets, with the pair of first fluid capture inlets laterally outwardly flanking the pair of first fluid delivery outlets and with an additional first fluid capture inlet laterally sandwiched between the pair of first fluid delivery outlets.

5. The process of claim 1 wherein the first moving substrate comprises a long axis, wherein the at least one first fluid delivery outlet comprises an elongated shape with a long axis, and wherein the long axis of the at least one first fluid delivery outlet is generally aligned with the long axis of the first substrate.

6. The process of claim 1 wherein the first moving substrate comprises a long axis, wherein the at least one first fluid delivery outlet comprises an elongated shape with a long axis, and wherein the long axis of the at least one first fluid delivery outlet is oriented transversely to the long axis of the first substrate.

7. The process of claim 1 wherein the first moving substrate is in contact with the surface of a first backing roll and the second moving substrate is in contact with the surface of a second backing roll, and wherein the first fluid delivery outlet comprises an arcuate shape generally congruent with the surface of the first backing roll, and wherein the surface of the first backing roll, and the surface of the second backing roll, respectively carry the first and second substrates along converging paths toward each other and into contact with each other so that the melt-bonding can be performed.

8. The process of claim 1 wherein the first substrate comprises a polymer film and wherein the second substrate comprises a nonwoven fibrous web.

9. The process of claim 1 wherein the first substrate comprises a nonwoven fibrous web and wherein the second substrate comprises a polymer film.

* * * * *